United States Patent [19]

Leslie

[11] Patent Number: 5,115,514
[45] Date of Patent: May 19, 1992

[54] MEASURING AND CONTROLLING SIGNAL FEEDBACK BETWEEN THE TRANSMIT AND RECEIVE ANTENNAS OF A COMMUNICATIONS BOOSTER

[75] Inventor: Samuel A. Leslie, Forest, Va.

[73] Assignee: Orion Industries, Inc., Solon, Ohio

[21] Appl. No.: 231,766

[22] Filed: Aug. 12, 1988

Related U.S. Application Data

[63] Continuation-in-part of Ser. No. 81,120, Aug. 3, 1987, Pat. No. 4,941,200.

[51] Int. Cl.$^5$ .......................... H04B 1/60; H04B 7/14
[52] U.S. Cl. .......................... 455/9; 455/17; 455/24
[58] Field of Search .................. 455/14–17, 455/9–10, 24, 33, 67; 375/3.1, 3, 4; 370/13.1, 75, 69.1; 340/514, 516

[56] References Cited

U.S. PATENT DOCUMENTS

| | | | |
|---|---|---|---|
| 3,028,489 | 4/1962 | Chasek | 455/9 |
| 3,411,088 | 11/1968 | Hutchison | 455/9 |
| 3,448,383 | 6/1969 | Starzec et al. | 455/24 |
| 3,450,841 | 6/1969 | Zeiser et al. | 370/75 |
| 3,696,429 | 10/1972 | Tressa | 455/24 |
| 3,913,017 | 10/1975 | Imaseki | 340/825.03 |
| 4,041,389 | 8/1977 | Oades | 455/17 |
| 4,163,121 | 7/1979 | Yoshikawa et al. | 379/59 |
| 4,198,600 | 4/1980 | Oguchi et al. | 455/15 |
| 4,317,216 | 2/1982 | Kaegebein | 455/16 |
| 4,383,331 | 5/1983 | Davidson | 455/24 |
| 4,475,243 | 10/1984 | Batlivala et al. | 455/22 |
| 4,475,246 | 10/1984 | Batlivala et al. | 455/24 |
| 4,479,245 | 10/1984 | Batlivala et al. | 455/9 |
| 4,638,479 | 1/1987 | Alexis | 370/95 |
| 4,646,345 | 2/1987 | Zdunek et al. | 379/62 |
| 4,677,687 | 6/1987 | Matsuo | 455/10 |
| 4,701,935 | 10/1987 | Namiki | 455/24 |
| 4,704,734 | 11/1987 | Menich et al. | 455/33 |
| 4,754,495 | 6/1988 | Kawano et al. | 455/17 |
| 4,776,032 | 10/1988 | Odate et al. | 455/24 |
| 4,789,993 | 12/1988 | Ryu | 455/24 |

FOREIGN PATENT DOCUMENTS

0133148 10/1980 Japan ....................... 455/24

OTHER PUBLICATIONS

"A Frequency Offset Booster with an Oscillation Prevention Function for Land Mobile Communication", Hitoshi Ohdate, copyright date of 1987.

Primary Examiner—Reinhard J. Eisenzopf
Assistant Examiner—Andrew Faile
Attorney, Agent, or Firm—Dressler, Goldsmith, Shore, Sutker & Milnamow, Ltd.

[57] ABSTRACT

A cellular communication system booster has plural narrowband and wideband channels each having down mixers, local oscillators, IF filters, and amplifiers for amplifying communication signals. On a narrowband channel preferably not in use, and preferably in a time-multiplexed manner, a reference signal of known signal strength is substituted at the output amplifier in lieu of a normal communications signal. When this amplified reference signal is broadcast at the output antenna a portion of the signal is feed back to the input antenna due to imperfect isolation between the antennas. This feedback signal is measured by a Radio Signal Strength Indicator (RSSI) circuit at the point of its receipt into the IF filter of the narrowband channel. The measured signal strength serves as a measurement of signal isolation/feedback between the antennas. A microprocessor receiving the measurement and knowledgeable of the reference signal strength controls the gain of the channel amplifier so as to maintain the feedback signal 10 dB below the reference signal, thereby preventing RF signal feedback oscillation. In different embodiments the reference signal may be derived from an injection oscillator or, alternatively, from an actual communication signal upon another communications channel. Isolation/feedback measurements are typically stepped across multiple channels spanning the entire communications frequency band, thereby providing measurement and appropriate control at all frequencies and operational conditions.

14 Claims, 14 Drawing Sheets

1

MEASURING AND CONTROLLING SIGNAL FEEDBACK BETWEEN THE TRANSMIT AND RECEIVE ANTENNAS OF A COMMUNICATIONS BOOSTER

The present patent application is a continuation-in-part of Pat. application Ser. No. 081,120 filed Aug. 3, 1987 U.S. Pat. No. 4,941,200.

FIELD OF THE INVENTION

The invention pertains to electronic boosters usable to sense and to repeat or retransmit selected electronic signals. More particularly, the invention pertains to boosters usable in cellular mobile systems to improve intra-cell coverage. More particularly, the invention pertains to boosters that measure the signal feedback, and signal isolation, between the output and the input antennas of the booster under all conditions of operation.

BACKGROUND OF THE INVENTION

1.0 Problems in Implementing Cellular Radio Systems

Current cellular system implementations involve the use of a few to the use of many cells to over a given geographical area. The cells are designed to provide some degree of overlapping coverage. They are also designed to allow reuse of the same channels several cells away (but within the same geographical area).

In practice, cellular system cell-site designs do not cover all the desired coverage areas due to the anomalies of RF propagation. For example, a narrow depression in the terrain such as a ravine or along a road adjacent to a river bed may not have adequate signal coverage due to blockage from nearby terrain. Another example would be in an underground parking garage, or even in large office buildings where larger than normal signal attenuation would result in unacceptable signal levels. Furthermore, cell sites in some cellular systems are not located close enough together, thus resulting in poor coverage areas between the cells.

The addition of new cell sites to remedy such problems is prohibitive in many cases. This is because the numbers of subscribers in these areas are generally of insufficient quantity to justify the cost of a new cell site installation. A low cost alternative solution to this problem is to employ a cellular repeater or booster near the coverage area in question. Such a repeater is intended to retransmit the channels from a nearby (donor) cell into the problem area. The retransmitted channels can then be received by appropriate mobile units in the area. Likewise, transmissions from mobile units in the problem can be retransmitted by the booster such that they can be heard by the channel receivers at the donor cell site.

Since mobiles are always under control by the cellular system in regard to which channels they are assigned to operate on, a preferred technique for signal boosting is to retransmit on the same channel on which the signal was received. This approach has no impact on the signaling operation of either the cellular system or the mobile, but does require careful control and attention to the installation of the booster to prevent RF feedback oscillation. Separate antennas arranged to maximize isolation are used to provide sufficient margin between the received and retransmitted signals. RF amplifier gain through the retransmission path must be limited to a nominal value of less than the amount of isolation between the two antennas under all operating conditions.

Also, the problem is complicated by the current implementation of the cellular system spectrum. The spectrum is currently split between a "wireline" and a "non-wireline" carrier. Each carrier has available a minimum of 21 control channels to be used for assigning mobiles to voice channels, and for placing and receiving calls to and from the mobiles. The control channel groups of the two carriers are adjacent to each other in the center of the cellular band. The adjacent locations of the control channel groups require special control and coordination between the two carriers to prevent unwanted mobile responses from the other carrier's cell site equipment.

1.1 Prior Implementations of Cellular Radio Systems

Current cellular booster implementations employ broadband linear amplifiers with filtering to eliminate out-of-band signals. These approaches generally provide a degree of signal enhancement in the area of the booster for a mile or so, which generally is all that is desired in the majority of the cases. However, several problems have been experienced with this solution.

Multiple signals through the broadband linear amplifier create spurious intermodulation products. These products may cause interference with other mobiles and/or stations in the cellular system, interference with competing or adjacent cellular systems, and interference with non-cellular services adjacent to but outside of the cellular bands. Imperfections in even highly-linear amplifiers will cause generation of these unwanted spurious products.

In addition, the competing system's control channel set is immediately adjacent to the control channel set of the target cellular system being repeated. This creates a difficult filtering requirement to prevent the wrong control channels from being amplified. Broadband boosters typically repeat both sets of control channels. This could result in lost mobile calls for the competing system if the booster amplifier did not cover the entire voice band of the competing system.

Finally, an interference region is created on those control channels where signals from the primary source (cell site or mobile) are at or near the same signal level as the boosted or enhanced signal. Signaling completion in these regions is difficult, with many lost calls being a result. Boosted voice signals in these regions are not nearly as affected, since the human ear will integrate out the rapid signal level variations caused by the nearly equal signal levels.

These problems results in limiting the applications and hence the number of areas where such boosters can be installed.

Current known systems employ broadband linear amplifiers for repeating the desired cellular band on an F1-F1 basis (i.e., same frequency out as the same frequency in). Separate antennas usually with highly directive patterns are employed to both achieve isolation between the transmit and the receive antennas, and to minimize the radiation of interfering signals to locations other than the area intended.

To overcome the filtering problem involved in preventing the repeating of the adjacent or competing cellular system's control channels, a combination of a narrow band channel amplifier set to the desired control channel and a broadband amplifier with a reasonably sharp filter for the voice channel set may be used. In this manner, the band pass response of the voice channel broad band filter may be selected such that the competing system's control channels are attenuated sufficiently to prevent improper operation with the competing cellular system.

Also, automatic reduction of the gain of the broadband amplifier via the use of analog AGC circuits has been used to prevent nonlinear operation (and the subsequent unwanted generation of excessive intermodulation products). The disadvantage of this approach, however, is that the weaker signals being repeated may be suppressed to unacceptable levels when nearby mobiles are transmitting. The use of automatic power control by the cellular system may help this situation somewhat; but there will be situations where a nearby mobile may be operating on a cell other than the target "donor" cell, and thus would not be under the control of the donor cell.

The use of individual channel filters to overcome the intermodulation problem has been viewed as uneconomical, since such an approach would require a channel set for every channel that may be installed in the donor cell. Since the area being covered by the booster will generally have a much lower subscriber "population" than that covered by the donor cell, there would be no need to repeat all the donor channels. In fact, there are many areas where a system operator may want to provide coverage but the expected subscriber population is such that only a couple of channels may be needed.

Implementation of the cellular system to determine which channel(s) the cellular booster should repeat would normally require system control of such a complexity that it would be on the order of a standard cell site implementation. Since there could well be many more boosters than cell sites in a given cellular system (i.e., to provide coverage into individual buildings), the designers of the cellular system equipment would understandably be disinclined to dedicate system processing facilities to cover these booster stations. Also, the design of such a cellular booster would be highly dependent on the type of system employed.

Hence, there continues to be a need for cost-effective boosters usable in cellular mobile systems. Such boosters preferably will repeat a limited number of channels without generating spurious signals.

2.0 Problems With Signal Feedback in Cellular Radio Systems

Cellular boosters operate on the same principles as an amplifiers: the cellular input signals are amplified and retransmitted on the same set of frequencies. Two separate antennas and an amplifier may be used in each boosted path. A forward and a reverse path are typically separated by 45 MHz in the cellular service to allow full duplex (telephone-like) operation. The two signal paths of a full duplex communication channel would thus employ four antennas and two amplifiers.

Duplexers may be used to reduce the number of antennas from four to two. A full duplex communication channel would thus employ two antennas, two duplexers, and two amplifiers. However, even with the use of duplexers, the basic principle of using separate antennas to provide isolation between the amplifier input and output remains.

As previously explained, retransmission on the same channel on which a signal was received requires careful control and attention to the installation of the booster to prevent RF feedback oscillation. Booster oscillation is very undesirable since it can cause interference to a large number of cellular users in the general area.

The separate antennas are physically arranged so as to maximize isolation in order to provide sufficient margin between the received and retransmitted signals. Radio Frequency (RF) amplifier gain through the retransmission path must be limited to a value that is less than the amount of isolation between the two antennas under all operating conditions. Typically the RF gain of the amplifier path is maintained to be 10 dB less than the amount of isolation between the antennas. In general, it is desirable to operate the booster with as much gain as is possible while still preventing the booster from breaking into oscillation.

Undesired booster oscillation can occur due to changes in the environment in which the antennas are operated. An environmental change can reduce the amount of isolation between antennas and can therefore cause the booster to oscillate. Environmental changes can occur due to weather (ice, snow or rain), physical changes (wind, changes in nearby structures, foliage on trees, movement of antenna coaxial cables), or aging of various components of the antenna system. The system installer is thus required to increase the amount of margin between antenna isolation and booster gain to allow for these contingencies. The achievement of adequate margin typically undesirably mandates the reduction of booster gain after the antennas have been optimally positioned. Reducing booster gain to provide additional margin can make the difference between a system which provides adequate coverage and one that does not.

The problem of undesired booster oscillation is further compounded by the isolation between antennas not being a constant over the frequency range of the cellular bands. Thus, the system installer must determine the minimum isolation point within the range of frequencies that are being boosted and establish adequate margin for even this point.

2.1 Prior Approaches to Controlling Signal Feedback in Cellular Radio System

Current cellular radio systems use either adequate safety margin on booster gain, or else use a rudimentary form of reducing gain if the booster should break into oscillation. In the latter case, an output power level in excess of a preset level is assumed to be an oscillation condition. Upon the occurrence of such a condition the booster gain is reduced in an attempt to stop the booster from oscillating. One disadvantage to this approach is that gain reduction can be triggered by a mobile which happens to be very near to the booster because a strong signal level from the mobile can cause the booster to exceed its preset threshold level for reduction in gain. Another disadvantage is that the booster can be oscillating without sufficient gain occurring in the feedback path so as to increase the power output to a level exceeding the preset threshold level for reducing gain.

Another approach has been described by Hitoshi Ohdate of the NTT Electrical Communications Laboratories in a paper published in the conference record of the 37th IEEE Vehicular Technology Conference (1987). In the paper, entitled "A FREQUENCY OFFSET BOOSTER WITH AN OSCILLATION PREVENTION FUNCTION FOR LAND MOBILE COMMUNICATION", Ohdate describes a booster where the output signal is offset slightly from the input signal by around 100 Hz or so. This frequency offset creates a beat note between the output and input signals. This beat note is detected in the input path. The amplitude of the beat note increases as the booster approaches an oscillatory condition, and the detected amplitude of the beat note is used to reduce the gain of the booster to an acceptable level. The disadvantage of this approach is that it purposely adds a frequency offset to all boosted signals. This frequency offset could theoretically cause the boosted mobile or base station to exceed the U.S. Federal Communication Commission (FCC) limits on frequency tolerance for broadcast cellular communications signals.

SUMMARY OF THE INVENTION

1.0 Selected Boosting of Cellular Communication Signals

In accordance with the invention, a method and an apparatus are provided for selecting one or more of a plurality of cellular mobile communications signals which would benefit from being boosted. The apparatus includes a plurality of communications paths for providing communications paths for providing communications from a cell site to one or more mobiles active in a region of coverage of the cell site. The apparatus also includes a plurality of communication paths for providing communication between the one or more active mobiles and the cell site.

The cell site is in radio frequency transmission with the apparatus by means of highly directive antennas. Input from the cell site, at a radio frequency range of 824–849 megahertz, is passed through a duplexer. Incoming signals from the duplexer are separated in a multi-coupler. Output signals from the multi-coupler are a plurality of parallel radio frequency communication paths in the same 824–849 megahertz frequency range.

Each of the communications paths includes an intermediate frequency amplification block. The intermediate frequency amplification block provides for amplification of the audio or control signal carried by the RF signal. Output from each of the intermediate frequency blocks, an amplified RF signal, is amplified in an RF amplifier. The outputs of each RF amplifier, from each intermediate frequency block, are combined in a high-power combiner. Output of the combiner, coupled, through a duplexer, is transmitted by an antenna to the mobile units.

Incoming signals from the active mobile units pass through the duplexer and are split in a multi-coupler. The separated parallel signals pass through a plurality of parallel intermediate frequency blocks, of the type noted above. Output from each of the intermediate frequency blocks, an amplified RF signal, is combined in a combiner into a single output signal. This output signal is amplified in a linear output amplifier and transmitted through a duplexer. Output from the duplexer, via the directional antenna, is transmitted to the cell site.

The apparatus operates under the control of a stored program control unit. The stored program control unit can include a microprocessor along with random-access memory for temporary storage, electrically erasable read-only memory for nonvolatile storage and electrical programmable read-only memory for control program storage. An interface port can be provided to the microprocessor for diagnostic and test purposes.

Further, in accordance with the invention, the method includes steps of setting an initial minimum threshold and a higher "action" threshold. An active mobile channel is scanned. The signal on the active mobile channel is tested to determine whether or not it exceeds the minimum, predetermined threshold. If not, that signal is not a candidate for boosting or repeating. If the sensed signal does exceed the minimum threshold it is then tested to determine whether or not it exceeds the "action" thresholds. If it exceeds the "action" threshold and it is currently being repeated the signal on the next available channel is then considered.

If the present signal exceeds the "action" threshold but is not being repeated, the last J readings in a storage stack associated with the present signal are set to the current reading. An identifier of the present channel is then stored, indicating this channel is a potential candidate for boosting.

In the event that the present signal does not exceed the "action" level threshold, an indicator of its strength is stored on an associated stack. In the event that the present channel is currently being boosted, a determination is made as to whether or not the last I out of K readings exceed the minimum threshold. If not, then the channel is removed from the table of those to be boosted. If the last I out of K readings exceed the minimum threshold, then the next channel is examined.

In the event that the present signal is not currently being boosted, a determination is made as to whether or not the last I out of J readings of the signal exceed the minimum threshold. If not, the channel is not a candidate for boosting. If so, an average value of the last I out of J readings is formed and stored in a list indicating the present channel is a potential candidate for boosting.

The remaining channels are then examined. Subsequent to all of the channels having been examined, a determination is made as to whether or not there are more candidates for boosting than there are available repeater channels. If not, then a determination is made as to whether or not the list of active channels is different from the list of channels to be boosted. If so, necessary channels are either dropped or added, based on the current list of those to be boosted. If the number of candidate channels exceeds the number "n" of available repeater channels, the "n" strongest candidate signals are selected.

The above method and apparatus can be utilized to provide an F1-F1 mode of operation wherein the boosted signal is transmitted at the same frequency as it is received. Additionally, the above-noted method and apparatus can be operated in an F1-F2 mode of operation wherein the incoming signal is retransmitted, after having been boosted, at a different frequency.

3.0 Measurement of Signal Feedback in Cellular Communication Systems, and Adjustment of Booster Amplification Gain in Accordance with Measured Feedback The present invention further contemplates a method and apparatus for measuring the feedback of boosted electromagnetic communications signals, and for controlling booster amplification gain in accordance with the measured feedback.

A booster, or any signal-passing communication device with or without amplification, may be considered to receive at an input port and to retransmit at an output port one or more electro-magnetic communications signals. When signal feedback exists between the output and input ports due to imperfect isolation therebetween, then electromagnetic signal feedback arises.

In accordance with the present invention this feedback is measured by substituting, at a position in-line in a signal path within the booster and before its output port, a reference signal of known signal strength for a communications signal that is normally present in the signal path. The reference signal is then transmitted from the output port of the booster. The strength of the feedback portion of the reference signal is then measured, at another position in-line in the signal path within the booster after its input port but before the position at which the reference signal was substituted.

The measured signal strength is indicative of both the strength of the communications signal and the strength of that feedback portion of the transmitted reference signal that was received at the input port of the booster.

For best results, and for easiest interpretation of the measured signal strength, substitution is normally performed only where, and after such times as, the strength of the communications signal normally and initially upon the signal path within the booster is determined, by an initial measuring, to be negligible. In such a case the measurement at the actual times of the substitution is substantially only of the strength of the feedback portion of the transmitted reference signal. The measured signal strength at the times of the substitution is thus a direct measurement of the magnitude of feedback being experienced by the booster.

Further in accordance with the present invention, the gain of the booster amplification is controlled in accordance with the measured signal strength. The gain control is directed to assuring that the measured feedback signal strength should not exceed a predetermined level, typically 10 dB or more below the known signal strength of the reference signal. By this control booster oscillation is avoided.

Further in accordance with the present invention, the reference signal of known strength may be derived from an actual communications signal instead of being generated. An actual, non-reference and non-feedback, electromagnetic communication signal that is (i) other than the communications signal that will be substituted for, and (ii) in-line in another signal path within the booster other than that signal path in which the reference signal will be substituted, is used. The strength of this actual communications signal is measured, normally in a Received Signal Strength Indicator (RSSI) circuit. The signal is then routed, typically by being converted in frequency in an output mixer, to thereafter become the reference signal of known signal strength that is transmitted.

When the feedback portion of this signal is received it will be upon the signal path, or booster channel, that is being tested. The strength of the signal upon this channel is measured, typically by another RSSI circuit. This RSSI circuit in the tested channel is separate from that RSSI circuit which previously measured the actual communications signal upon the other channel. Comparison of the two signal strength measurements upon the two channels gives a measurement of signal feedback.

The feedback measurements in accordance with the present invention are typically accomplished in a time multiplexed manner with, and without substantial interference to, ongoing communications activities. The booster typically communicates or is available to communicate actual communications signals for greater than a 99% duty cycle and communicates the reference signal for less than 1% duty cycle during its total use.

Microprocessor control permits time sequencing, flexible administration, and data recording of the feedback testing process measurement data. Tight and timely control of booster gain substantially immunizes the booster against undesired feedback oscillation. Troublesome changes in the booster and its signal environment may be timely recognized by assessment of the record data.

Numerous other advantages and features of the present invention will become readily apparent from the following detailed description of the invention and the embodiments thereof, from the claims and from the accompanying drawings in which the details of the invention are fully and completely disclosed as a part of this specification.,

DETAILED DESCRIPTION OF THE PREFERRED EMBODIMENT

Figure 1:
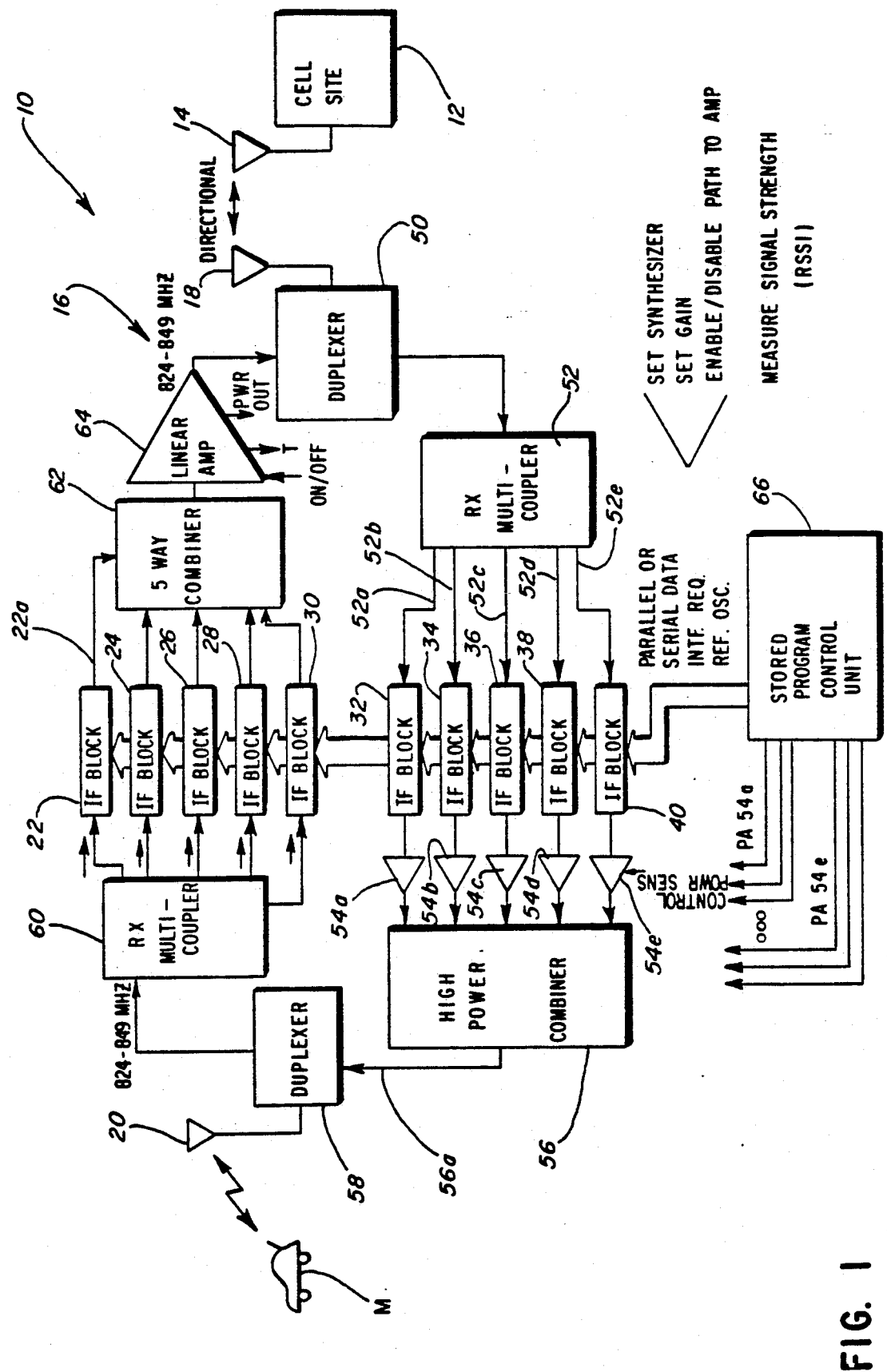
FIG. 1 is an overall schematic block diagram illustrating a booster in accordance with the present invention.

While this invention is susceptible of embodiment in many different forms, there is shown in the drawing and will be described herein in detail a specific embodiment thereof with the understanding that the present disclosure is to be considered as an exemplification of the principles of the invention and is not intended to limit the invention to the specific embodiment illustrated.

1.0 A Booster Selectively Boosting Cellular Communication Signals

FIG. 1 illustrates a system 10 in accordance with the present invention. The system 10 includes a fixed cell site 12 of a conventional variety used in connection with cellular mobile radio telephone service. The cell site 12 includes a transmitting and receiving antenna 14.

A booster 16 is illustrated in FIG. 1 in bidirectional communication with the cell site 12 and a mobile unit M. The booster 16 includes a directional transmit and receive antenna 18 which is used to transmit signals to and receive signals from the cell site 12. The booster 16 also includes a second antenna 18 which is used to transmit signals to and receive signals from the cell site 12. The booster 16 also includes a second antenna 20 for transmitting signals to and receiving signals from the mobile unit M. The antenna 20 can be, but need not be, a directional antenna. The booster 16 can repeat both voice and control channels in connection with a cellular mobile transmission. The repeated channel can be repeated at the same frequency as received. Alternately, the booster 16 can shift the transmitted frequency from the received frequency.

The booster 16 includes a plurality of communication paths such as channel paths 22-30 which provide for transmission of five channels of control or audio in parallel between the mobile unit M and the cell site 12. The booster 16 also includes a plurality of cell site to mobile communication paths 32-40 for transmitting five channels of control or audio between cell site 12 and the mobile M.

Signals from the cell site 12 transmitted to the booster 16 and detected at antenna 18 pass through duplexer 50 and enter multi-coupler 52. The multi-coupler 52 provides RF amplification of low level signals. Output from the multi-coupler 52, on lines 52a-e, provides input to the communication paths 32-40 which, as discussed subsequently, are implemented as intermediate frequency transmission paths.

Output from each of the paths 32-40 is amplified in RF power output amplifiers 54a-e. Amplified outputs from the amplifiers 54a-e are combined in a high power lossless combiner 56. Alternatively, separate antennas may be employed for each RF power amplifier, or a very high power linear amplifier using distortion cancelling techniques may be used with a single antenna. The output from the combiner 56, on a single line 56a, is coupled to a duplexer 58. Output from the duplexer 58 is then transmitted via the antenna 20 to the mobile M.

Incoming signals received from the mobile unit M at the antenna 20 are coupled via the duplexer 58 to multi-coupler 60. Outputs from the multi-coupler 60 drive the intermediate frequency communication paths 22-30. Outputs from the paths 22-30 are combined in a five way combiner 62. The combined output from the five way combiner 62 is amplified in the linear amplifier 64. The output from the amplifier 64 provides an input to the duplexer 50.

Output from the duplexer 50 is coupled via the directional antenna 18 to the cell site 12. The intermediate frequency communication paths 22-30 and 32-40 operate under control of a stored program control unit 66. Each of the paths 22-30 is identical. Similarly, each of the paths 32-40 is identical.

The booster 16 provides for the use of individual channel filters, implemented as the intermediate frequency paths such as 22 or 32. The intermediate frequency paths 22-30 and 32-40 represent a subset of a total number of channels which would normally be available from the cell site 12 assuming that the mobile M would be in an area of good reception. The boosted control channel and voice channels may be transmitted between the booster 16 and the cell site 12 or between the booster 16 and the mobile M on the same frequencies as received (F1-F1 mode of operation) or on different frequencies (F1-F2 mode of operation). Frequency translation alleviates problems of signal cancellation on the periphery of the boosted area. This also permits the use of greater gain through the transmission paths 22-30 or 32-40.

Operation of the booster 16 is based on the fact that the closer the mobile M is to the cellular booster 16 the more likely that it will be in the vicinity where direct coverage from the cell site 12 is marginal. Mobiles near the cellular booster 16 will have higher signal levels then mobiles in other places. This provides a means for determining which channels require repeating. Accordingly, coverage in the problem area is achieved by placing the available individual communication paths on those channels associated with the strongest of the active mobile signals.

The cellular booster 16 scans all of the available donor cell channels in a brief period of time, less then a couple of seconds. For each scanned channel a running average is updated of the signals that exceed a minimum threshold. An average of I out J readings exceeding this threshold provides a readily implementable test which can be used to determine which signals should be repeated and which signals should be dropped.

Mobiles that are driving into the area served by the booster 16 are monitored for several scans thereof to determine the signal level trend before boosting or retransmission of the mobile is attempted. As a result, erroneous boosting of channels due to momentarily strong mobile signals can be minimized.

Subscribers approaching the coverage area of the booster 16 are generally picked up within five or ten seconds. The subscribers are dropped upon leaving the area due to either falling below a predetermined minimum threshold or being voted out by other stronger mobile system signals closer to the booster 16.

A specific transmission path can be provided for the control channel of the cell site 12 to allow mobile call originations or terminations to be completed for those mobiles which are not currently active but which are in the vicinity of the booster 16. The transmission path for the control channel may be purposely offset to provide F1-F2 repeater operation. For the same mobiles, an "action" threshold level is provided to allow quick response in setting up a boosted transmission path for a new call. This "action" threshold level is generally higher than the minimum threshold level. A signal exceeding this level is flagged for immediate action at the end of a scan. The mobile will transmit on the channel assigned by the cell site 12 for a maximum of five seconds without the presence of a correct supervisory audio tone being detected by the booster 16.

If the mobile signal exceeds the "action" threshold, a boosted transmission path will be placed on that channel within a couple of seconds. If the signal is below that threshold but above the minimum threshold, a boosted transmission path will be assigned within five seconds or so.

Weaker mobile signals that approach the minimum threshold will generally be in an area where some coverage is provided directly from the cell site 12. This provides adequate time for the booster 16 to average the readings and determine that a new channel is to be boosted.

The communication path 22 is identical to paths 24-30 and paths 32-40. A description of the structure of path 22 is thus applicable to the paths 24-40.

Figure 2A:
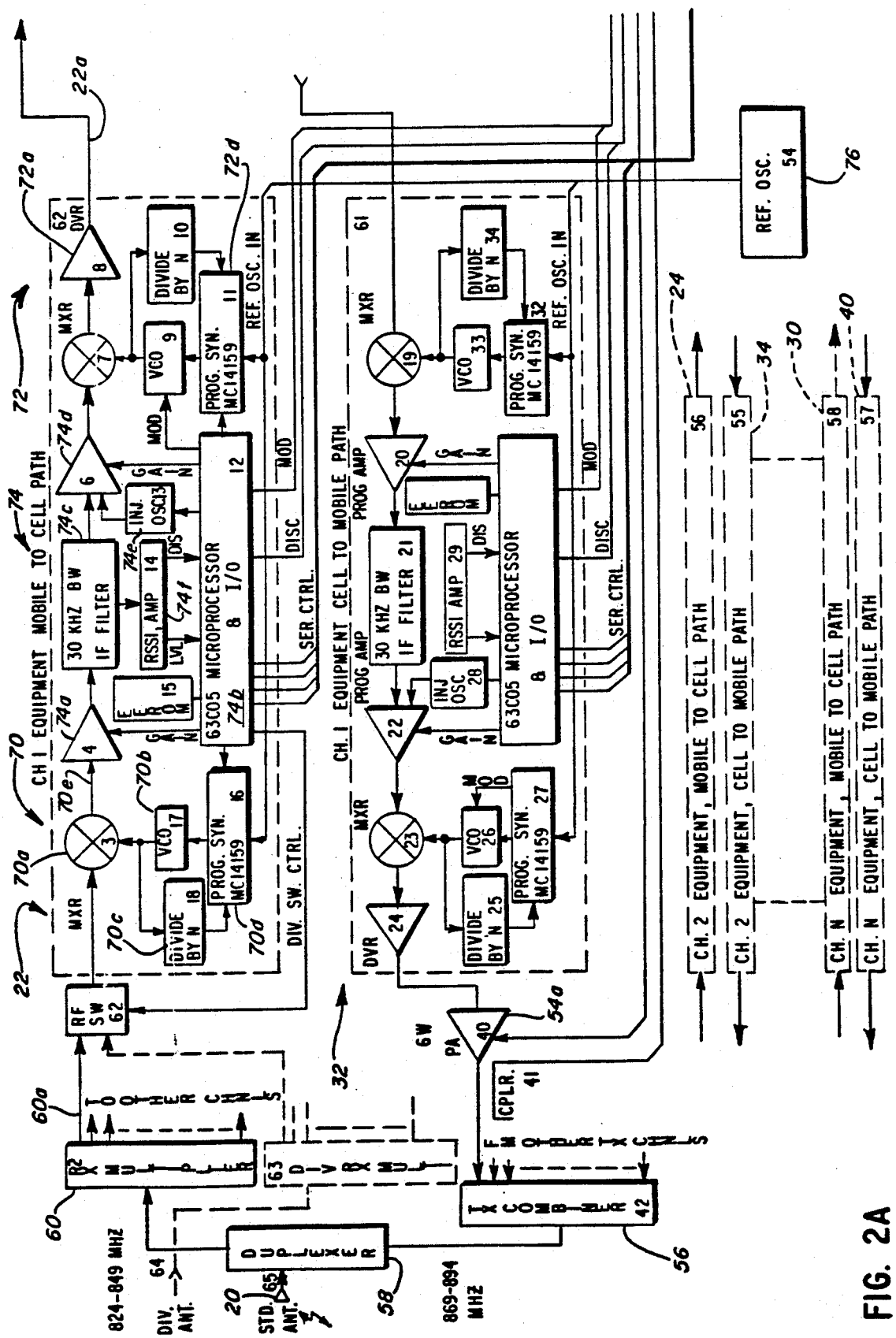
FIGS. 2A and 2B taken together are a more detailed schematic diagram of the booster of FIG. 1.
Figure 2B:
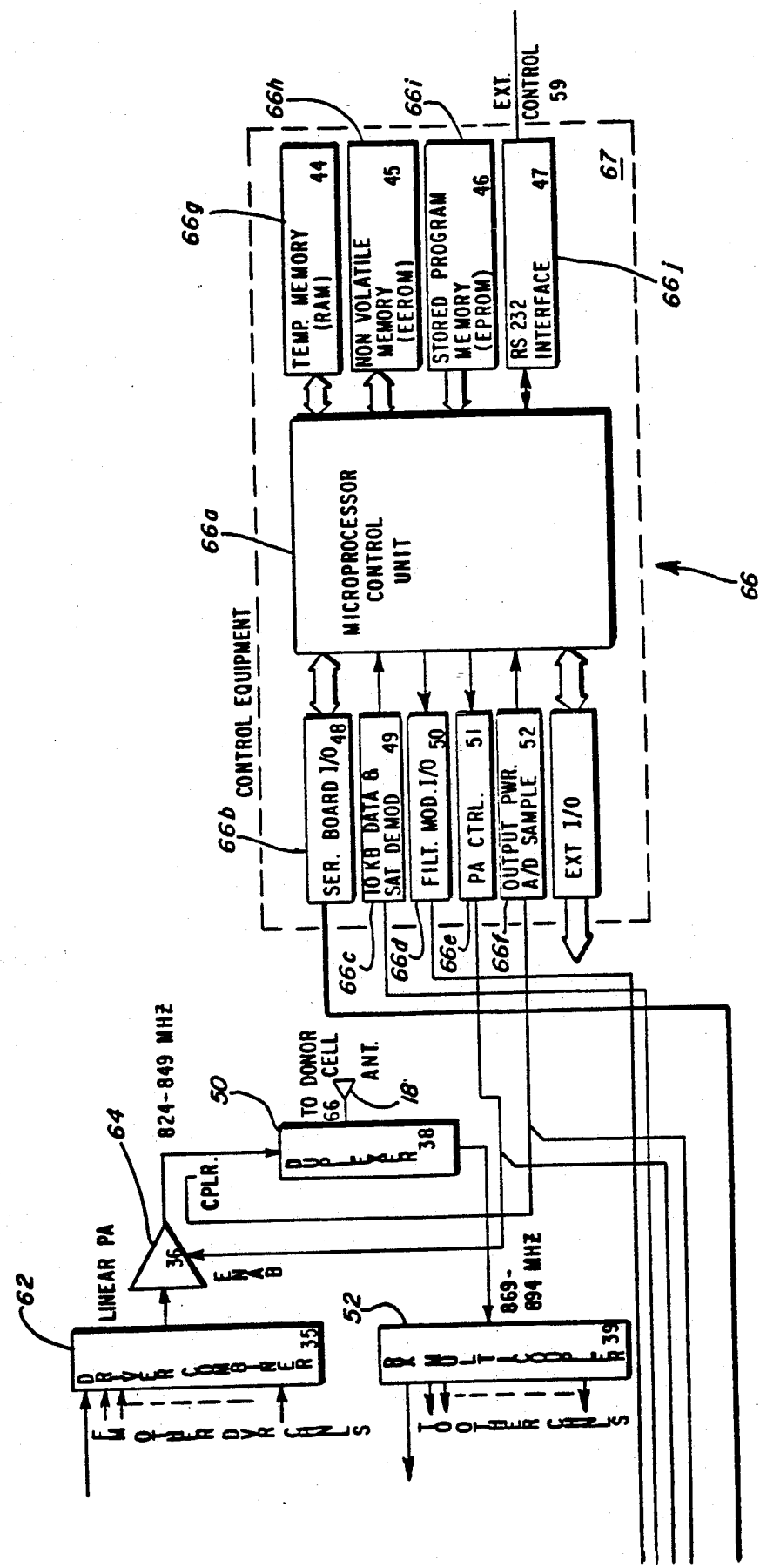

With respect to FIGS. 2A and 2B, the path 22 includes input circuitry 70 and output circuitry 72. Input to the path 22 on a line 60a from the multiplexer 60 is a modulated signal in the 824 to 849 MHz range. The circuitry 70 converts that high frequency input on the line 60a to an intermediate frequency in a range on the order of 70 MHz for the purpose of controllably amplifying that signal for retransmission to the cell site 12.

The circuitry 70 includes a mixer 70a. The mixer 70a can be a model SRA-1 marketed by Mini-Circuits Corp., or similar. The mixer 70a is controlled by a local voltage controlled oscillator 70b which provides a local oscillator input frequency for conversion of the input signal on the line 60a to the 70 MHz intermediate frequency. Output from the voltage controlled oscillator 70b also provides an input to divide by N circuitry 70c. The divide by N circuitry 70c is a frequency divider element which provides selected signals from the voltage controlled oscillator 70b to a frequency synthesizer 70d. The frequency synthesizer 70d can be implemented employing a MC14159 prescaler circuit in addition to other commonly used components such as voltage-controlled RF oscillators and stable reference oscillator sources.

Output from the mixer circuitry 70 on a line 70e at the 70 MHz intermediate frequency provides electrical input to the intermediate frequency circuitry 74. The intermediate frequency circuitry 74 includes a gain-programmable intermediate frequency amplifier 74a. The amplifier 74a is programmable and its gain is set by microprocessor 74b. Microprocessor 74b also provides control input signals to the synthesizer 70d.

Output from the programmable amplifier 74a is filtered in a 30 KHz bandwidth intermediate frequency filter 74c. The filter 74c provides adjacent channel rejection to signals 30 KHz or more away from the signal being repeated on the path 22.

Output from the intermediate frequency filter 74c drives programmable amplifier 74d which is identical to the amplifier 74a. Amplifiers 74a and 74d can be Avantek 0885 or similar. The 3.0 KHz bandwidth intermediate frequency filter 74c can be composed of several individual two-pole crystal filters such as NDK 70N20C.

Programmable amplifier 74d also receives input from an injection oscillator 74e. The oscillator 74e is a stable, crystal oscillator at the 70 MHz intermediate frequency. The oscillator 74e is used to inject an intermediate frequency signal into the programmable amplifier 74d when data is to be transmitted. The injection oscillator 74e operates under the control of the 63C05 microprocessor 74b.

Signal strength amplifier 74f is an IF amplifier which operates at a frequency lower than that of the filter 74c. This amplifier is a received signal strength indicator (RSSI). It provides both discriminator audio output and an analog DC signal output which is proportional to the radio frequency signal level input. The signal strength amplifier 74f provides its outputs to the microprocessor 74b and contains its own local oscillator for conversion to the lower intermediate frequency.

Intermediate frequency circuitry 72 includes a driver amplifier 72a. The amplifier 72a is a radio frequency amplifier used to provide sufficient signal level in the 824 to 849 MHz range to drive the linear output amplifier 64.

A reference oscillator 76 provides input to the two frequency synthesizers 70d and 72d. As a result of using two synthesizers, 70d and 72d which receive signals from the common reference oscillator 76, any offset in the input carrier frequency on the line 60a of the signal to be boosted will be translated to the output frequency on the line 22a. The transceiver in the mobile or the transceiver in the cell site 12 controls the basic accuracy of the boosted signal in this configuration.

The use of two frequency synthesizers 70d and 72d permits the offset of the control channel to another nearby control channel, as well as the offsetting of the voice channels. As a result, the problem of excessive data bit error rates when signal levels from the signal source in the mobile M and the output of the booster 16 are at the same or nearly the same signal levels at the target receiver at the cell site 12 can be minimized.

The above comments also apply with respect to the transmission paths 32 through 40 which are used for the purpose of boosting signals from the cell site 12 to the mobile M.

The stored program control unit 66 includes an 8031 Intel microprocessor 66a. The processor 66a provides overall control for the booster 16. It communicates with the other circuitry in the booster 16 via a serial board 66b. The control unit 66 also includes a 10 kilobit data demodulator and a 6 kHZ supervisory audio tone (SAT) demodulator 66c. The demodulator 66c includes circuitry for decoding the 10 kilobite data stream which is utilized in the cellular system and for measuring which of the SAT three 6 kHZ frequencies are being transponded by the cellular mobile unit such as the mobile unit M.

The control unit 66, also includes a filter modulator unit 66d. The unit 66d includes a low-pass filter and gate for sending 10KB/Sec data in the standard cellular format for frequency modulation of one of the paths in the booster 16.

The control unit 66 also includes a power amplifier control unit 66e. The power amplifier control unit 66e has outputs for enabling or disenabling the RF power amplifiers such as the amplifiers 54a-e and the amplifier 64. The power amplifier control unit 66e also includes an input for sensing the temperature of each of the power amplifiers.

The control unit 66 also includes an output power sampling unit 66f. The sampling unit 66f converts analog DC voltage which is proportional to the radio frequency output power of the amplifiers 54a-e and 64 to a digital word for processing by the control unit 66.

The control unit 66 also includes a random access memory module 66g, an electrically erasable read only memory module 66h for nonvolatile storage of alterable information and an electrically programmable read only memory module 66i for program storage. An RS232 interface 66j is also provided for connection of a computer terminal or a test cellular mobile to the booster 16.

The control unit 66 is utilized for maintaining signal level history for processing purposes as well as for controlling the frequency synthesizers, such as the synthesizers 70d and 72d. It is also used for setting the signal gain through each path as well as for measuring the received signal levels on each channel and for carrying out diagnostic and parameter setting functions.

A flow diagram, FIGS. 3A-3D, describes the sequence of events that takes place in determining candidate channels for boosting. All the channels of the cell site 12 are scanned. If the measured signal level from a mobile on any of the cell site channels exceeds a minimum preset threshold and also has the correct SAT frequency, that channel number and its signal level are recorded. A running history of the signal levels of the various mobiles that are active is maintained in a table.

At the end of each channel-set scan the data in the table are analyzed to rank the signals by level.

If there are more candidate channel readings than there are available booster channels, then the "n" highest readings from the ranking are selected. The "n" booster set is then placed on the channels associated with the "n" highest readings.

The cellular booster scans all of the donor cell channels in less than a couple of seconds. For each channel, it updates a running average of the signals that exceed the minimum threshold (an average of I out of J readings exceeding this threshold). Thus, mobiles that are driven into the area are monitored for several scans to determine the signal level trend before an actual retransmission of the mobile is attempted. In this manner, erroneous placement of repeater channels due to momentarily strong mobile signals is minimized. Thus, subscribers approaching the problem coverage area are generally picked up within 5 or 10 seconds, and are dropped upon leaving the area due to either falling below the minimum threshold or being "voted" out by other stronger mobile signals.

A transmission path is provided on the donor cell control channel to allow mobile call originations or call terminations to be completed for those mobiles that are in the poor coverage area but are not currently active. For these mobiles, an "Action" threshold level is provided to allow quick response in setting up a transmission path for the new call. This "Action" threshold level is generally higher than the minimum threshold level. A signal exceeding this level is flagged for immediate action at the end of a scan.

The mobile will transmit on the channel assigned by the donor cell site for a maximum of 5 seconds without the presence of the correct SAT before it disconnects the call. If the mobile signal exceeds the "Action" threshold, a transmission path will be placed on that channel within a couple of seconds. If the signal is below the threshold but well above the minimum threshold, then a repeater channel will be assigned within 5 seconds or so. Weaker mobile signals that approach the minimum threshold will generally be in an area where some coverage is provided directly from the cell site, thus allowing adequate time for the cellular booster to average the readings and determine that the new channel is to be boosted.

A parallel approach to assure that all new call attempts through the boosted control channel are connected through a boosted voice channel includes decoding the new channel assignments that are contained in the cell site control channel data stream. The signal level of the mobile responding to the channel assignment can thus be measured immediately, and its signal level compared with the current "running average" signal level set of other boosted channels. A transmission path can thus be assigned immediately unless all paths are already asigned to other stronger signals.

This approach is based on the premise that enough transmission paths will be available to handle the expected peak subscriber load of the problem coverage area. A grade of service factor will be present where peak loads with a lot of nearby mobiles may result in a denial of service to other mobiles which may need boosting. The cellular operator may accept this level of service. The level of service may be improved by adding additional transmission paths in much the same manner as establishing a grade of service with a standard cell site.

A degree of hysteris is provided to prevent mobiles from needlessly being dropped as they are moving about in the problem area. A new criteria (I out of K rather than I out of J readings, where K is larger than J) is applied to those channels currently being boosted. Thus, a larger number of readings below the minimum threshold is allowed before the call is dropped.

The flow diagram of FIGS. 3A-3D also illustrates a method for placing the mobiles on voice channels that are different than those assigned by the donor cell. This represents an F1-F2 mode of operation. This accomplished by sending the mobile a "handoff" message to place the mobile on a new unused voice channel. The information transmitted from the cell site is thus translated to the new channel on which the mobile has been placed. Transmissions from the mobile are translated back to the correct channel for reception by the cell site. If the mobile is in an area where the signal from the cell site is about the same level or is stronger than the signal from the booster, then the handoff will not be accomplished. This is desirable since signals from the cell site are strong enough to allow continued direct communication.

A mobile that is communicating with a cell site through the booster (operating in the F1-F2 mode) will be handed back to the original donor cell channel assignment as it drives out of the range of the booster's coverage area. This will allow the cell system to continue processing the call via normal handoffs if the mobile requires further attention.

With respect to FIGS. 3A-3D, a mode of operating the booster 16 will first be described wherein the incoming signal is retransmitted at the same frequency as received (F1-F1 mode). The booster can also be operated in the F1-F2 mode as described in FIG. 3D. With respect to the flow diagram, the booster 16 is first manually initialized in a step 100. Initialization includes specifying the total number of channels M available at the cell site 12. Next the number of transmission paths N, available in the booster 16, is specified. For the exemplary embodiment a total of 5 transmission paths are available each way. Next a minimum threshold level of the incoming signal from either the cell site 12 or the mobile M is specified. This threshold can be specified in decibels with respect to milliwatts. Signals above this minimum level are candidates for boosting or repeating. Signals below this level are disregarded.

An "action" level threshold is then specified. The "action" level threshold is higher than the minimum level threshold and is used to differentiate those mobiles which are quite close to the booster 16 and should be given priority service from those which are further away and might be receiving adequate service directly from the cell site 12.

Next the number of measurements J for each channel is specified for purposes of maintaining a running history of sensed incoming signals. A minimum number of acceptable measurements I is also specified. In operation there must be a minimum of at least I signals measured out of a total of J signals measured which are above the previously set minimum threshold in order to initiate signal boosting.

A number of acceptable measurements, K, is also specified at initialization. The number K is used for the purpose of determining whether or not to continue to enhance signals to and from a mobile unit M. The value of K is the same as or greater than the value of J.

Subsequent to the initialization step the booster in a step 102 initiates scanning by examining the first channel to determine if there are any mobiles active thereon. If an incoming signal from a mobile unit, such as the unit M, is detected, in a step 104, the booster 16 determines whether or not the correct supervisory audio tone (SAT) has been received. The SAT determines whether or not a signal being sensed is associated with the cell site 12. Signals not associated with the cell site 12 are not boosted.

Assuming a correct SAT signal has been detected, in a subsequent step 106 the booster 16 determines whether or not the channel currently being scanned is actively being boosted. If so, a five second SAT timer is initiated in a step 108. The SAT timer provides a five second delay which upon expiration, if this repeater channel is active, may permit the channel to be dropped. This would correspond to a signal which was properly being boosted initially and which at some point ceased to have the SAT associated with the cell site 12.

In a step 110 the incoming signal is compared to the preset minimum threshold to determine whether or not that threshold is exceeded. If that threshold is not exceeded then no boosting of that signal is attempted. If the signal does exceed the minimum prespecified threshold then boosting of that signal may be attempted.

In a subsequent step 112, the incoming signal is compared to the previously set "action" threshold level to determine whether or not the mobile unit M is exceedingly close to the booster 16. If the incoming signal exceeds the "action" level threshold in a step 114, the repeater checks to determine whether or not the incoming signal is already being boosted. If so, it goes on to check the next channel in a step 116.

If the signal is not already being boosted, in a step 118 the last J readings for this channel are set to the current value which has just been read in the step 112. By setting the last J values in the step 118 to the most recently read values, the signal becomes a very high probability candidate for being immediately repeated. This corresponds to the mobile unit M being quite close to the booster 16 and usually in a region wherein the cell site 12 provides inadequate service.

In the event that the currently sensed signal does not exceed the "action" level threshold in the step 112, that value is recorded along with the channel number on a stack in a step 120. In a step 122 the booster 16 determines whether or not this channel is currently being boosted. If not in a step 124 it determines whether or not the last I out of J readings associated with the present channel have been above the predetermined minimum threshold. If not, the signal is not a candidate for being boosted If the last I out of J readings do exceed the previously specified minimum threshold, then the signal is a candidate for being boosted. The average value of the last I readings along with channel number is recorded in a step 126. The next channel is then tested in a similar fashion until all of the channels associated with the cell site 12 has been examined.

In the step 122, if the signal is currently being boosted, in a step 128 the booster 16 determines whether or not the last I out of K readings exceeded the predetermined minimum threshold. If not, in a step 130 boosting of this signal ceases and the channel identification is removed from a table identifying those channels being boosted. If on the other hand in the step 128 the last I out of K readings for the signal are above the predetermined minimum threshold then the signal continues to be boosted and the booster goes on to the step 116.

Figure 3A:
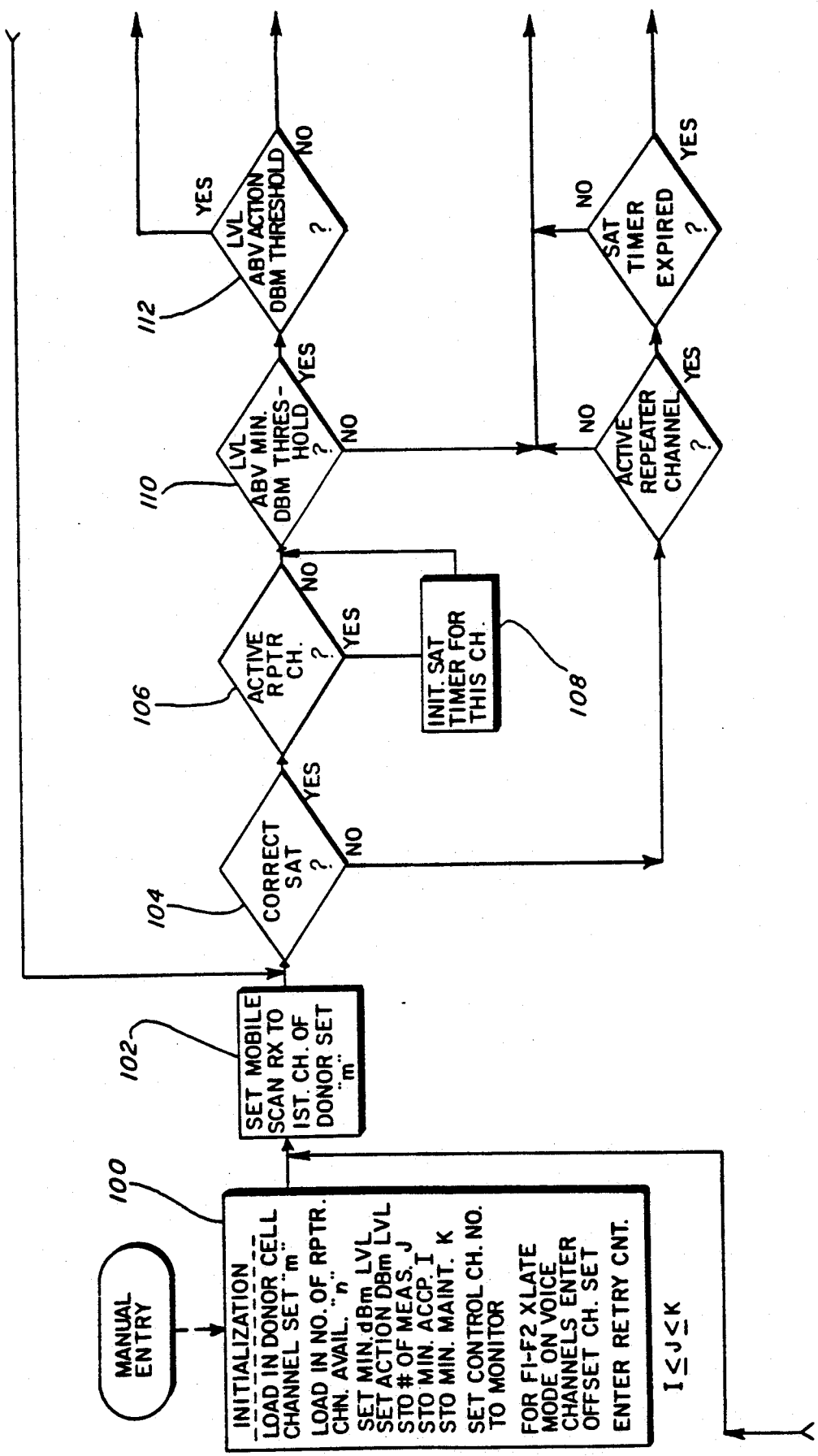
FIGS. 3A through 3D taken together are a flow chart illustrating various modes of operation of the booster of FIG. 1.
Figure 3B:
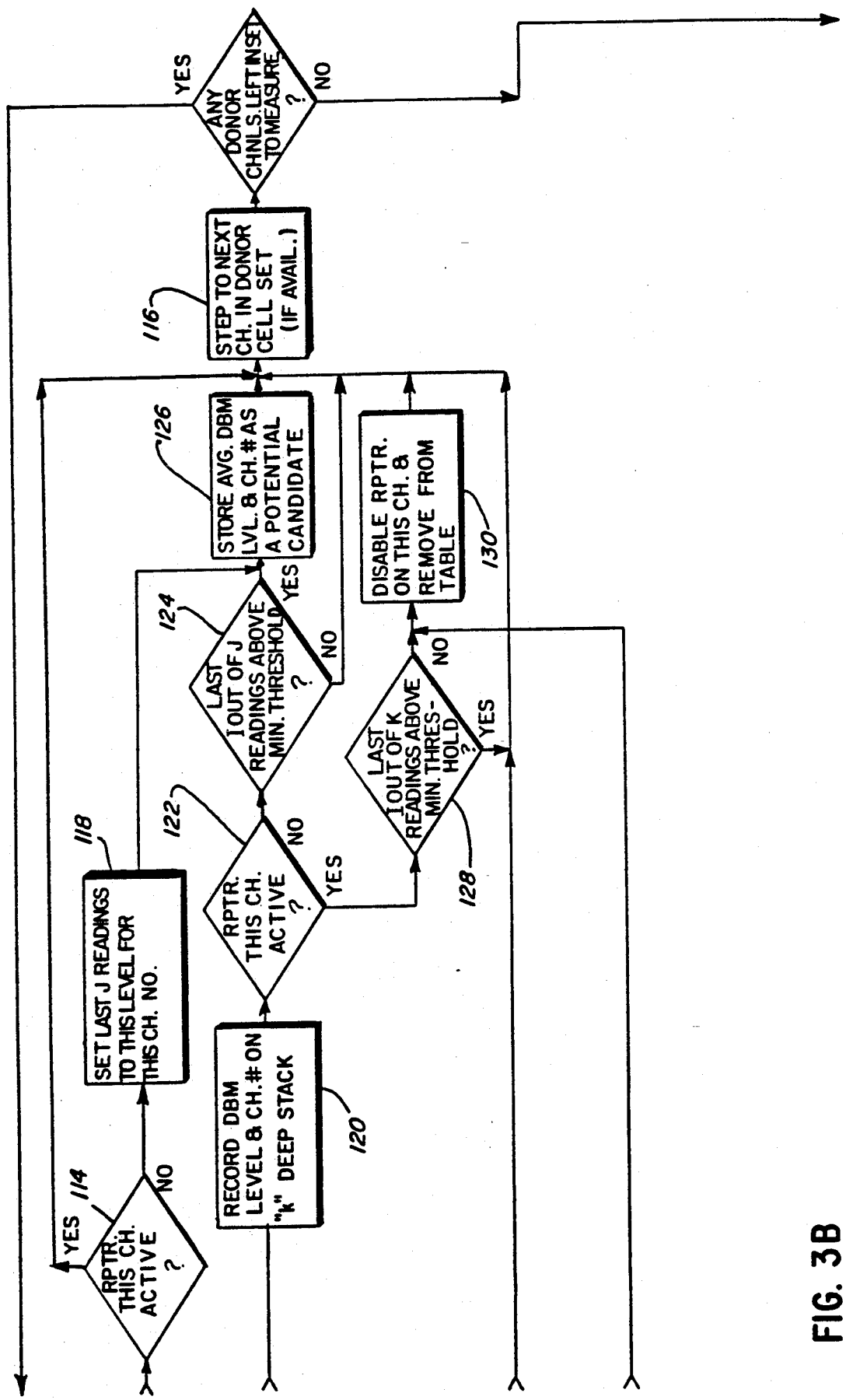
Figure 3C:
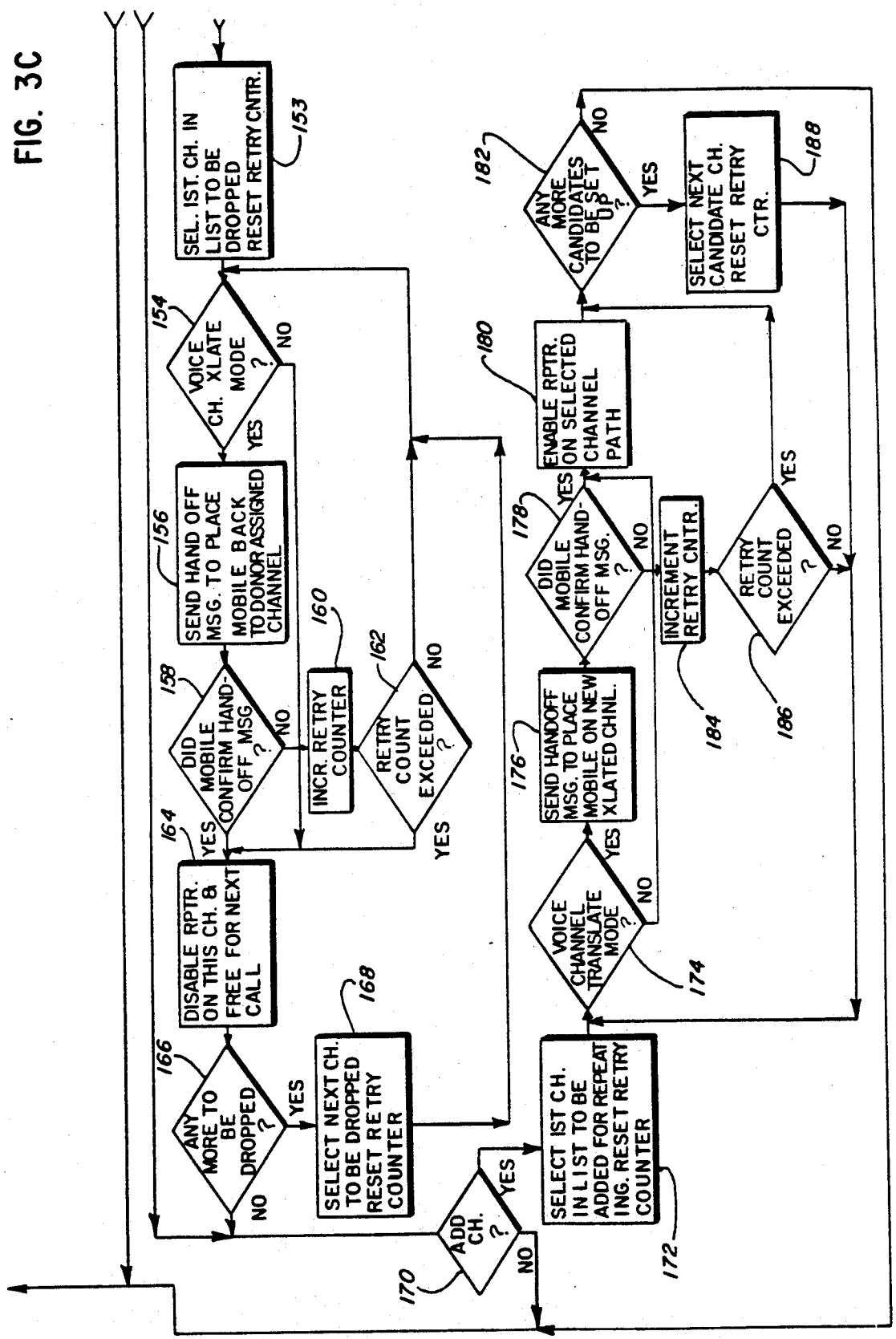
Figure 3D:
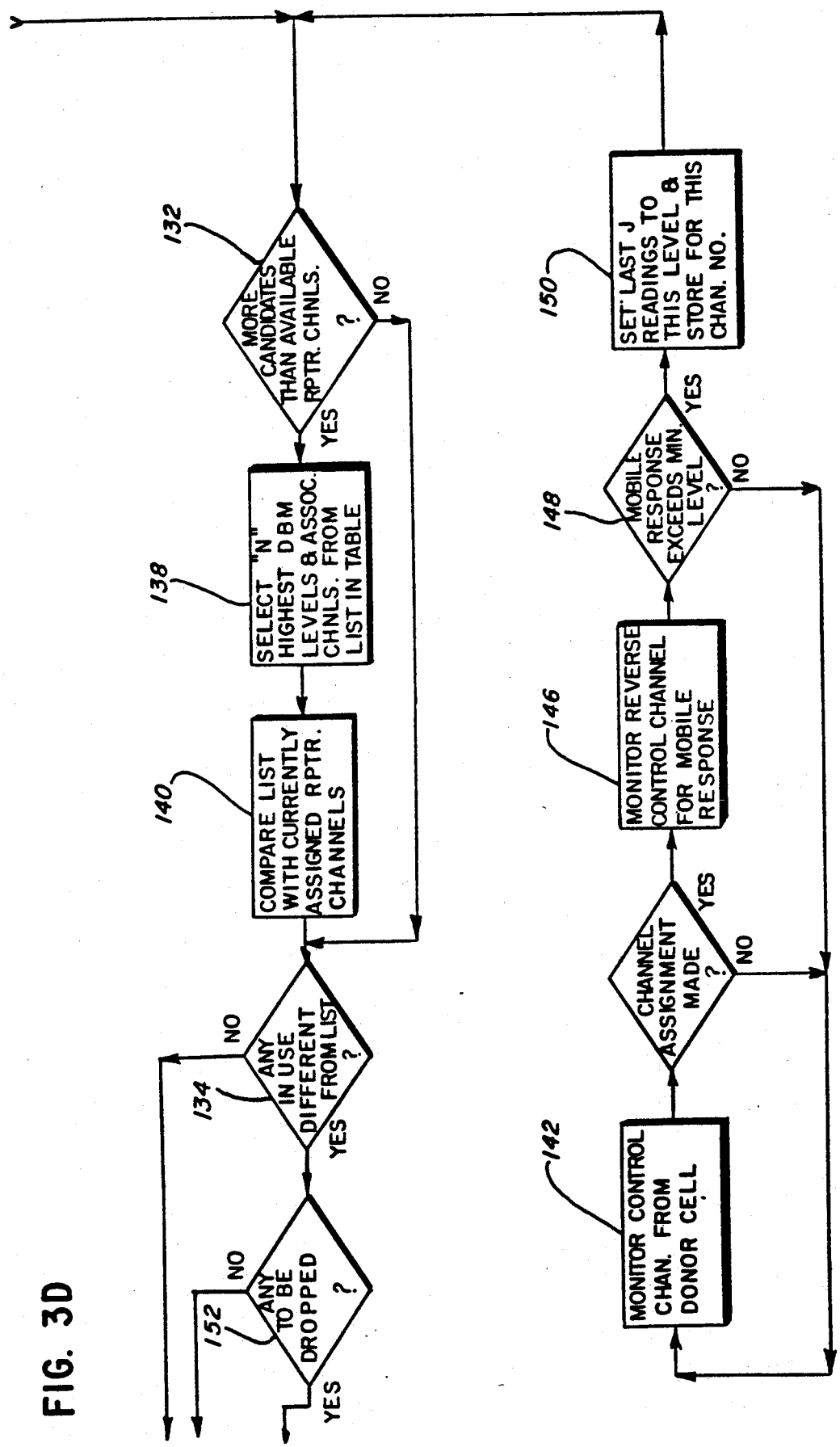
Figure 4:
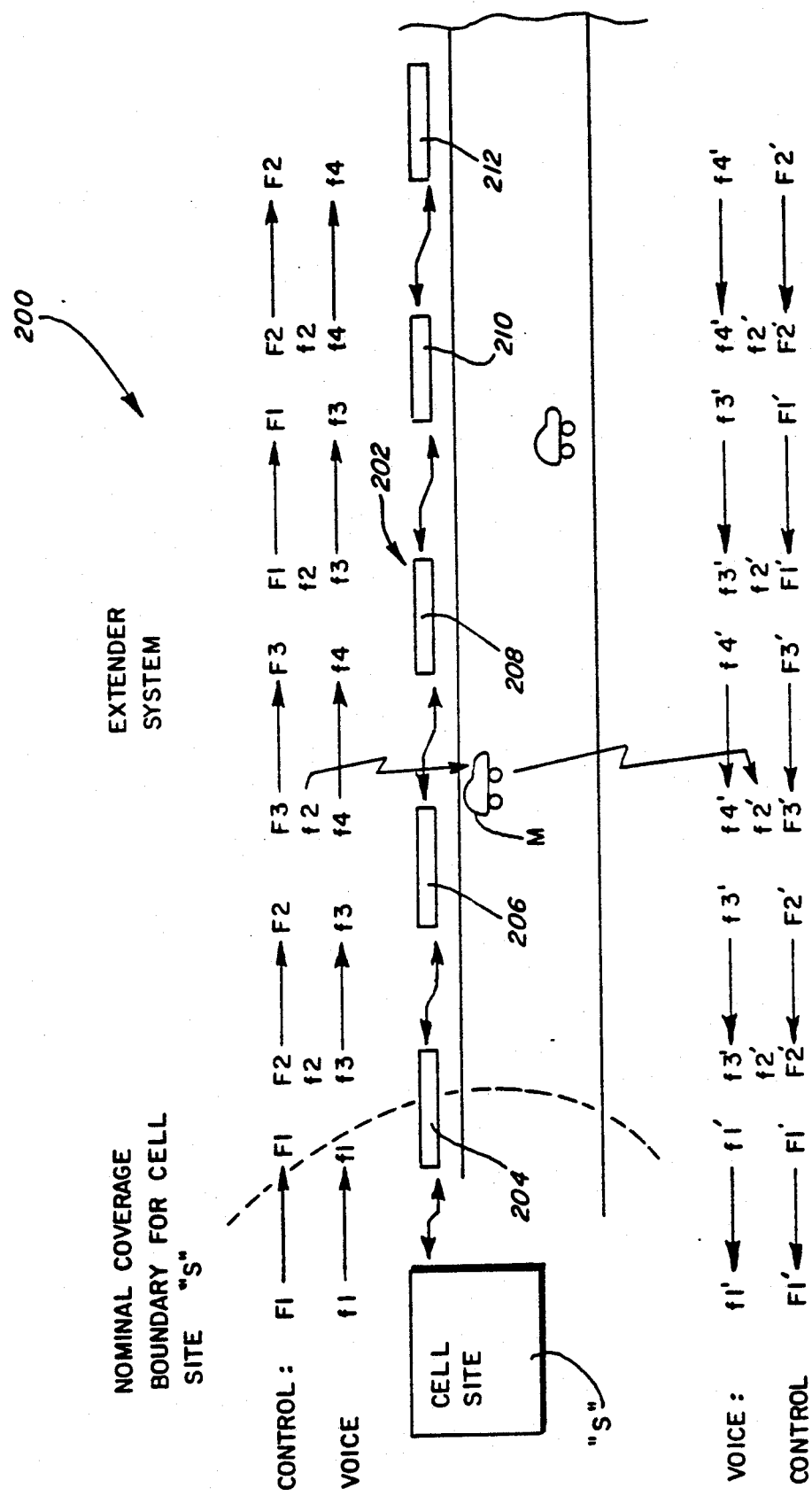
FIG. 4 is an overall diagram of a cell extender system incorporating a plurality of boosters of the type illustrated in FIG. 1.

With respect to FIG. 3D, a parallel process wherein the signal level information can be reapidly determined is accomplished by continuously monitoring in a step 142 the control channel from the donor cell. Whenever a channel assignment is monitored from the donor cell, the signal level from the intended mobile is measured in a step 146. If in a step 148 the mobile response to the channel assignment exceeds the minimum selected threshold level, then the channel table is updated in a step 150 to immediately add this channel to the candidate list. The minimum threshold level can be the same as the "Action" level described earlier. It could also be a separately programmed level that either is provided by the operator or determined on a dynamic basis from the table of received signal levels that are being received by the active repeater channels. This operation is analogous to the steps 118 and 126 described earlier, and is used in conjuntion with these two steps to continuouly update the candidate channel list.

Once all of the channels associatable with the cell site 12 have been measured, the booster determines in a step 132 whether or not there are more candidates for boosting than there are available booster transmission paths. If not, the booster 16 tests in a step 134 to determine whether or not the list of potential signals to be boosted is the same as or different from the list of those currently being boosted. If not, all of the channels continue to be repeated and the booster 16 returns to the step 102.

In the event that in the step 132 the booster 16 determines that there are more candidates available for enhancement then there are available booster transmission paths, in a step 138, a subset of the candidates available for repeating is selected. In a step 140 the list of potential candidates for boosting is compared with the currently assigned repeater channels. If there is a difference noted in the step 134, then a process of adding and/or dropping channels will take place, as illustrated by FIG. 3C.

The list of candidate channels is examined in a step 152 to first determine if any channels are to be dropped. This is necessary to release communication paths for assignment to new channels. If any are to be dropped, the first channel in the list to be dropped is selected in a step 153. Next, a determination is made in a step 154 to establish if this channel that is currently being repeated is a translated channel (F1-F2), or a same-frequency boosted channel (F1-F1). If it is not a translated (F1-F2) channel, then the channel repeater is immediately disabled in a step 164 to free up the channel equipment for a new call.

If it is a translated channel that is to be dropped, a hand-off message is first sent to the mobile in a step 156 to place the mobile back on the same channel as the donor cell (i.e., back to an F1-F1 mode). A test is made in a step 158 to determine whether the mobile acknowledges the hand-off message. If the mobile did not acknowledge the hand-off message, a retry counter is incremented in a step 160. The hand-off message is repeated if the retry count has not been exceeded in a step 162. Either acknowledgment of the hand-off message or exceeding the retry count will cause the repeater to be disabled for this channel. If the mobile does not acknowledge the hand-off message, then it is beyond the range of the booster.

After the channel has been dropped, in step 166 a check is made to determine if any other channels are to be dropped. If more channels remain, the retry counter is reset and the steps 156 through 164 are repeated as before to release transmission paths no longer required for signal boosting.

If there are no further channels to be dropped as determined in the step 166, or if there were no channels initially to be dropped as determined in the step 152, then a test is made in a step 170 to determine whether any channels are to be added. If not, then the booster returns to the step 102. The parallel monitoring of new channel assignments in steps 142 through 150 continues to determine and update new candidates for channel assignment.

If in the step 170 a determination is made that new channels are to be added, then the first candidate channel that is to be added is selected in a step 172 Next, a determination is made in a step 174 to establish if this channel is to be a translated channel (F1-F2), or a same-frequency boosted channel (F1-F1). If it is not to be a translated (F1-F2) channel, then an available channel repeater, communication path, is immediately assigned to this channel in a step 180.

If the voice channel is to be translated, then a hand-off message containing the new channel assignment is sent to the mobile on the original channel to which the mobile has been assigned by the donor cell, in a step 176. If the mobile confirms the hand-off message on the newly assigned channel, in a step 178, then the channel equipment associated with the call is enabled in the F1-F2 frequency translation mode, in a step 180.

If the mobile did not acknowledge the hand-off message, then a retry counter is incremented in a step 184. The hand-off to the target mobile is then retransmitted If the mobile fails to acknowledge the hand-off message after "N" retries as in a step 186, then the repeater equipment is not enabled for this candidate.

A determination is then made in a step 182 whether any other candidates are to be processed. If so, then the next channel is selected and the retry counter is reset in a step 188. The channel equipment is set up as previously described for steps 174 through 180 and 184 through 186. After all channel candidates have been processed, then the cells by repeating the downlink signals from the cell site S to the mobile M and the uplink signals from the mobile M to the cell site S. The repeated signals are relayed from booster to booster using two sets of frequencies that are not part of the mobile frequency set that is in use. Logic in the booster based upon received signal levels determines whether the booster repeats the mobile frequencies or the booster frequencies.

Regardless of how many boosters 204-212 are in series, the mobile M will always use a single set of frequencies for voice or audio channel use when functioning through any of the boosters. This has the advantage that no hand-off is necessary in the mobile as it moves from the coverage of one booster to another booster. Hand-off is required when the mobile moves from the booster coverage area to the cell-site coverage area because the cell site S uses another set of frequencies for the voice channels.

The cell site S dictates which voice channels the mobile is to operate on during the initial stages of the call setup. In a normal mode of operation, the booster that is processing a call setup to or from a mobile immediately sends a hand-off message to that mobile to place it on a channel in the f2 set. The booster closest to the donor site S then translates the mobile frequency back to the original channel in the f1 frequency set that was assigned by the cell site S. In an alternate mode of operation, the hand-off step described above may be bypassed by incorporating the f2 frequency set in the channel assignment list at cell site S, while maintaining the f1 frequency set for actual transmission and reception of voice messages to the nearest booster in the corridor. In either case, a single set of frequencies (the f2 set) for mobile conversations in the booster within the chain in conjunction with the stored program logic contained within the boosters causes only the booster that has a usable signal from the mobile and is closet to the cell site S to communicate with the mobile on a channel in the f2 frequency set.

The control channel requires two or more different frequencies because the down-link control channel must be repeated at each booster to provide continuous coverage throughout the booster corridor area. If omnidirectional antennas are used for booster transmissions to and from the mobile, then a third set of frequencies may be necessary to preclude interference between even or odd-numbered boosters along the corridor.

Use of directional antennas can allow just two frequency sets to be used for control channel transmission. The control channel signal from cell site S can thus be repeated on alternate channels at each booster in the chain.

The booster logic for relaying the control channel uplink signal is similar to the voice channel logic. The booster will relay the mobile uplink signal if it is receiving a usable signal. If not, then the uplink signal from the down-stream booster if it is present, will be retransmitted. Otherwise, the control channel uplink booster is off.

The frequency allocation for the system 200 requires four sets of frequencies and in some cases one extra control channel frequency, includes the frequency set for the cell site. There is a one-for-one relationship between the frequencies in one set and the frequencies in another set. The table below shows an example for a four booster extender system.

TABLE I

| FREQUENCY ALLOCATION | | |
| --- | --- | --- |
| DOWNLINK | CONTROL CHANNEL | VOICE CHANNEL |
| CELL-SITE XMIT | F1 | f1 |
| BOOSTER 204 | | |
| RCV | F1 | f1 |
| XMIT | F2 | f2 or f3 |
| BOOSTER 206 | | |
| RCV | F2 | f3 |
| XMIT | F1 | f2 or f4 |
| BOOSTER 208 | | |
| RCV | F1 | f4 |
| XMIT | F2 | f2 or f3 |
| BOOSTER 210 | | |
| RCV | F2 | f3 |
| XMIT | F1 | f2 |
| UPLINK | CONTROL CHANNEL | VOICE CHANNEL |
| BOOSTER 210 | | |
| RCV | F1' | f2' |
| XMIT | F2' | f3' |
| BOOSTER 208 | | |
| RCV | F2' | f2' or f3' |
| XMIT | F1' | f4' |

TABLE I-continued
FREQUENCY ALLOCATION

| BOOSTER 206 | | |
|---|---|---|
| RCV | F1' | f2' or f4' |
| XMIT | F2' | f3' |
| BOOSTER 204 | | |
| RCV | F2' | f2' or f3' |
| XMIT | F1' | f1' |

Table II illustrates the operation of the system 200 when calls are originated while the mobile M is in the coverage area of the system 200. The mobile M remains on its initially assigned voice frequency as it moves from one coverage area to another such as from booster 206 to booster 208.

TABLE II
RADIO CALL SEQUENCE AND FREQUENCY PLAN FOR A FOUR BOOSTER SYSTEM

| CELL SITES | | | | | | |
|---|---|---|---|---|---|---|
| UPLINK | R | | B(F1) | D(f1) | F(f1) | |
| DOWNLINK | X | A(F1) | | C(F1) | E(f1) | F(f1) |
| BOOSTER 204 | | | | | | |
| UPLINK | X | | B(F1) | D(f1) | F(f1) | |
| | R | | B(F3) | D(f3) | F(f3) | |
| DOWNLINK | R | A(F1) | | C(F1) | E(f1) | F(f1) |
| | X | A(F2) | | C(F2) | E(F3) | F(f3) |
| BOOSTER 206 | | | | | | |
| UPLINK | X | | B(F3) | D(f3) | F(f3) | |
| | R | | B(F4) | D(f4) | F(f4) | |
| DOWNLINK | R | A(F2) | | C(F2) | E(f3) | F(f3) |
| | X | A(F1) | | C(F1) | E(f4) | F(f4) |
| BOOSTER 208 | | | | | | |
| UPLINK | X | | B(F4) | D(f4) | F(f4) | |
| | R | | B(F2) | D(f2) | F(f3) | |
| DOWNLINK | R | A(F1) | | C(F1) | E(f4) | F(f4) |
| | X | A(F2) | | C(F2) | E(f2) | F(f3) |
| BOOSTER 210 | | | | | | |
| UPLINK | X | | | D(f3) | F(f3) | |
| | R | | | D(f2) | F(f2) | |
| DOWNLINK | R | A(F2) | | C(F2) | | F(f3) |
| | X | A(F1) | | C(F1) | | F(f2) |
| MOBILE M | | | | | | |
| UPLINK | X | | B(F2) | D(f2) | F(f2) | |
| DOWNLINK | R | A(F2) | | | E(F2) | |

(Fx) = CONTROL CHANNEL IN FREQUENCY SET x
(fx) = VOICE CHANNEL IN FREQUENCY SET x
MOBILE ORIGINATION STEPS:
A: CELL SITE S TRANSMITS A CONTINUOUS STREAM OF CONTROL DATA ON THE DOWNLINK THAT IS REPEATED AT EACH BOOSTER SITE. ADJACENT SITES USE DIFFERENT FREQUENCIES. MOBILE M SCANS AND LOCKS ONTO THE STRONGEST SIGNAL.
B: MOBILE THAT IS ORIGINATING A CALL TRANSMITS THE REQUEST ON CONTROL CHANNEL UPLINK.
C: CELL SITE S RECEIVES A REQUEST AND ASSIGNS A NOT-BUSY VOICE CHANNEL IN THE f2 FREQUENCY SET AND TRANSMITS THE ASSIGNMENT ON THE CONTROL CHANNEL DOWNLINK.
D: MOBILE M RECEIVES CHANNEL ASSIGNMENT, SWITCHES TO THE ASSIGNED VOICE CHANNEL, AND TRANSMITS A SAT TONE. IF A FREQUENCY OFFSET PLAN IS USED AT THE DONOR CELL SITE TO ASSIGN THE MOBILE TO THE CORRECT CHANNEL IN THE f2 SET, THEN BOOSTER 208 REPEATS THE SIGNAL RECEIVED DIRECTLY FROM THE MOBILE M. OTHERWISE, BOOSTER 208 FIRST SENDS A HAND-OFF MESSAGE TO PLACE THE MOBILE ON A CHANNEL IN THE f2 SET BEFORE REPEATING THE MOBILE SIGNALS BACK TO THE DONOR CELL SITE.
E: CELL SITE S RECEIVES THE SAT TONE ON THE ASSIGNED VOICE CHANNEL AND COMPLETES THE RADIO VOICE CHANNEL CONNECTION.
BOOSTER TO BOOSTER HAND-OFF STEPS:
F: MOBILE M MOVES OUT-OF-RANGE OF BOOSTER 208 INTO THE BOOSTER 210 COVERAGE AREA. BOOSTER 208 SWITCHES THE RECEIVED UPLINK FREQUENCY TO THE UPLINK SIGNAL (f3 SET) FROM BOOSTER 210 AND SWITCHES THE DOWNLINK TRANSMIT FREQUENCY TO THE f3 FREQUENCY. THE MOBILE M REMAINS ON THE f2 FREQUENCY VOICE CHANNEL.
LAND-LINE ORIGINATION STEPS:
G: CELL SITE S PAGES MOBILE M ON THE CONTROL CHANNEL, PATH AS IN STEP A.
H: MOBILE M ACKNOWLEDGES PAGE ON UPLINK CONTROL CHANNEL, PATH AS IN STEP B.
I: CELL SITE S RECEIVES AN ACKNOWLEDGEMENT AND ASSIGNS A NOT-BUSY VOICE CHANNEL, AS IN STEP C.
J: NEXT STEPS ARE THE SAME AS STEPS D AND E, EXCEPT THAT AN ALERT MESSAGE IS SENT BY CELL SITE S TO CAUSE THE MOBILE TO RING.

Hand-off of the mobile M as it moves from a cell-site coverage area into the system 200 coverage area or as it moves out of the system 200 coverage area will require varying responses. Three approaches that may be used individually or in combination are:

A. LAST-RESORT APPROACH

When the mobile signal to Booster 204 falls below a threshold level and no uplink signal is being received from the Booster 206, a hand-off command is generated to switch the mobile M to the f1 frequency and remove the uplink signal to the cell site S. If the mobile has moved into the coverage area of the cell site S, the cell site will begin receiving the mobile uplink signal and hand-off will have been accomplished. If the cell site fails to receive the mobile, the call is lost.

When the mobile signal to the cell site causes the hand-off routine to be initiated and no other cell is a candidate for hand-off, cell site S will hand the mobile to a not-busy voice channel in the f2 frequency set. If the Booster 204 begins to repeat the mobile on the appropriate uplink f1' frequency to the cell site, hand-off will have been accomplished.

B. GAIN REDUCTION APPROACH

If the mobile signal level falls such that it is not above the minimum acceptable signal strength at any of the Boosters 204-212 but a communications path still remains, then the booster associated with the mobile will reduce its gain in the return path to the cell site S by several dB. This reduction in gain will be passed by each booster in the path, and in turn will be detected by the cell site S. If the signal drops below cell site S's threshold for minimum acceptable communications, then cell site S will initiate a hand-off request to adjacent cell sites to determine which, if any, cell can be targeted for mobile hand-off.

When the mobile moves from cell S to the system 200 coverage area, the above LAST RESORT APPROACH is used.

C. REMOTE LOCATING APPROACH

This approach establishes a two-way data path between the cell site S and the desired booster at which signal levels are to be measured. When the cell site S requests a signal level measurement on a given channel, this information is sent to the target booster which in turn will tune an unused channel receiver to the channel requested, measure the signal level, and then return the measured signal level to the cell site S. The data communications path used for this remote signal measuring technique may either be an unused cellular channel pair or may be via means external to the cellular system (i.e., microwave, telephone line, fiver optic, etc.) The information thus provided by this communications path can be used by the cell site S for determining whether mobiles should be handed to or from the booster area, or to other cell sites.

Figure 5:
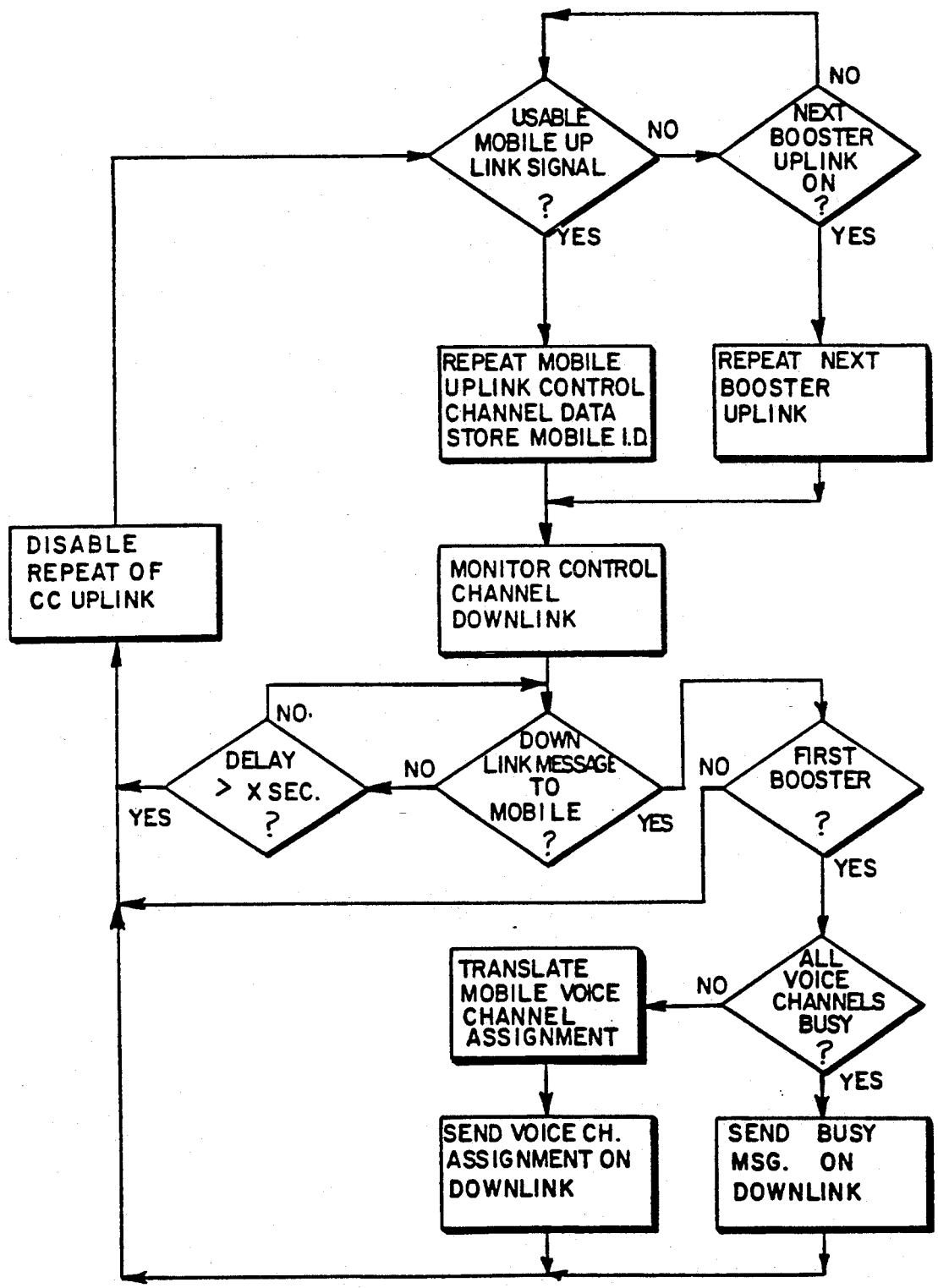
FIG. 5 is a flow diagram of control channel repeating by a booster in the extender system of FIG. 4.

FIG. 5 is a flow diagram for each of the Boosters 204-212 that determines which uplink signal is to be transmitted on the Booster control-channel uplink: the mobile, the next Booster, or nothing. The control channel Booster always transmits the received downlink on the mobile control channel frequency. Before being transmitted to the mobile, the voice channel assignment may need to be modified to the frequencies in the Booster to the mobile set. If this is the case, the control channel logic in the Booster closest to the cell site S must modify the channel assignment because it is the only Booster that can determine which voice channels in the Booster set assigned to the system 200 are free for assignment. If all voice channels in the Booster set are busy, it must generate a busy signal to send to the mobile M.

Figure 6:
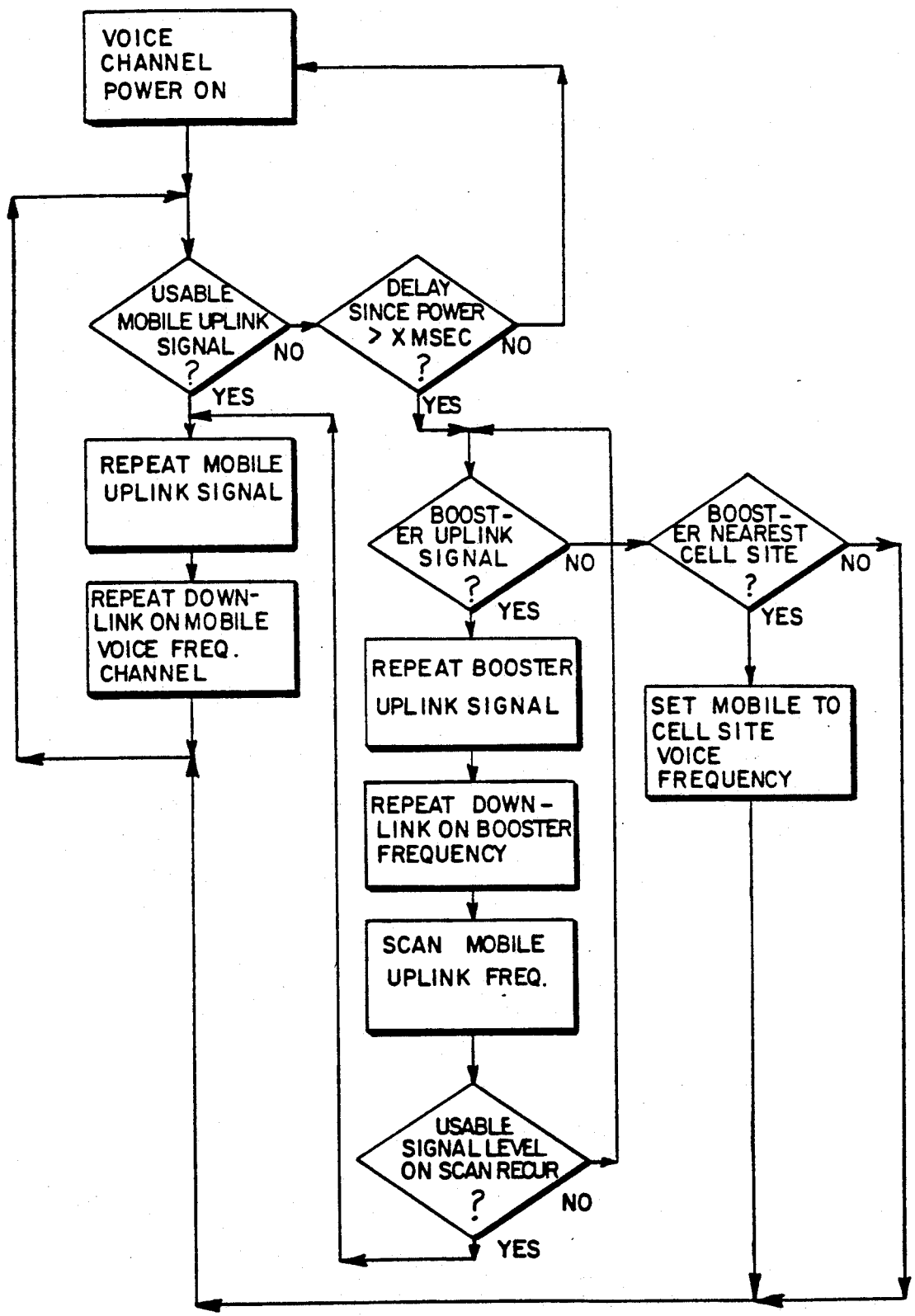
FIG. 6 is a flow diagram of voice channel repeating by a booster in the extender system of FIG. 4.

FIG. 6 is a flow diagram for each of the Boosters 204-212 that determines which voice channel signals to repeat: the mobile, the next Booster, or nothing. If the Booster is receiving a usable mobile uplink voice channel signal, it will always repeat the mobile uplink and transmit the voice channel on the mobile downlink frequency. In the case of an uplink signal but no downlink signal, only the uplink is repeated.

A scanning receiver is used to monitor the mobile channels to detect a mobile that has moved into its coverage area after the mobile voice channel was assigned by the cell site S control channel. Voice channel logic will force the mobile M to be repeated by the Booster that is nearest the cell site S if it is receiving a usable uplink signal, even though the next Booster may be receiving a stronger signal.

Figure 7A:
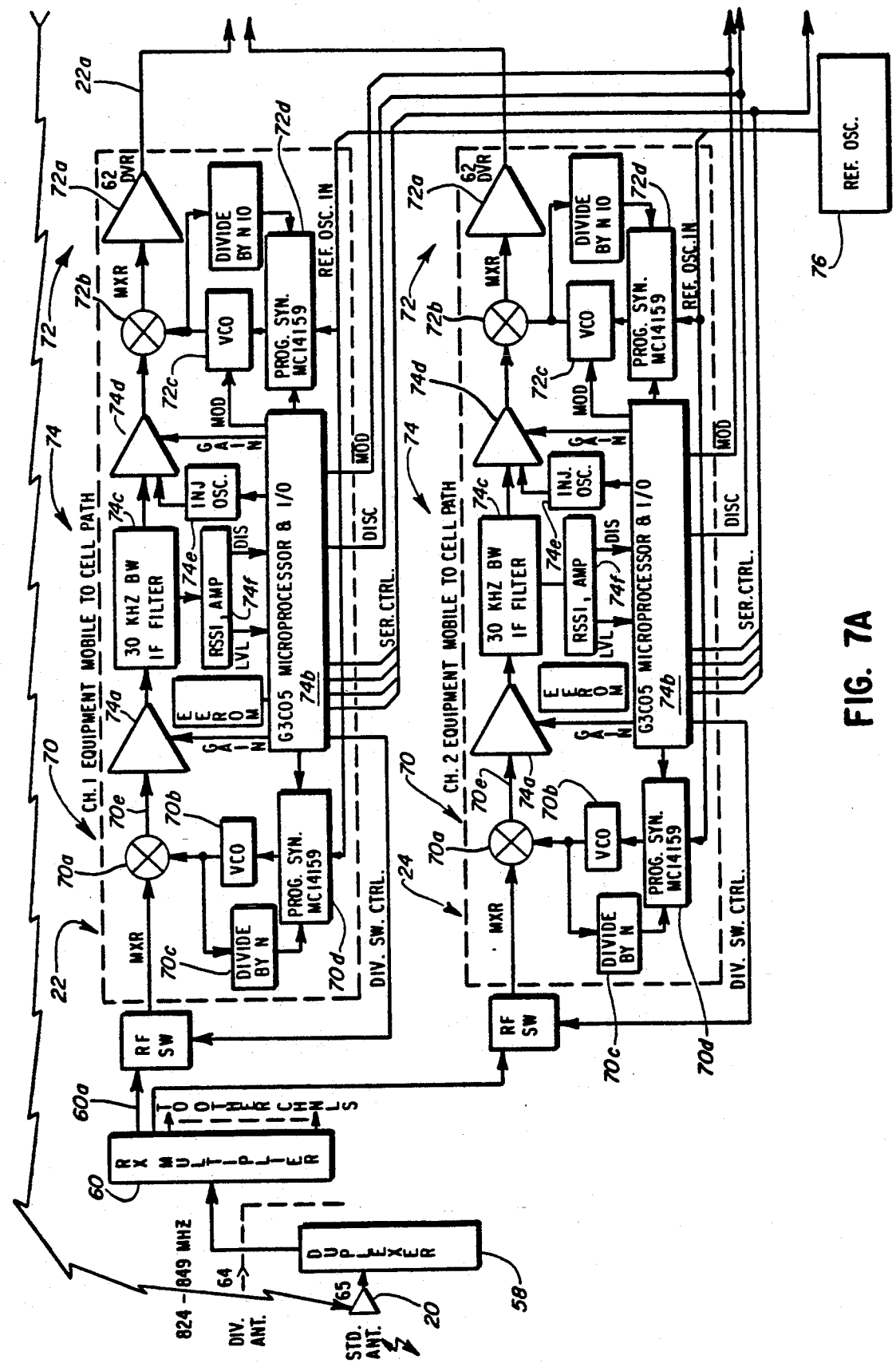
FIGS. 7A and 7B taken together are still another more detailed schematic diagram of the booster of FIG. 1 and a repartitionment of the detailed schematic diagram of FIGS. 2A and 2B.
Figure 7B:
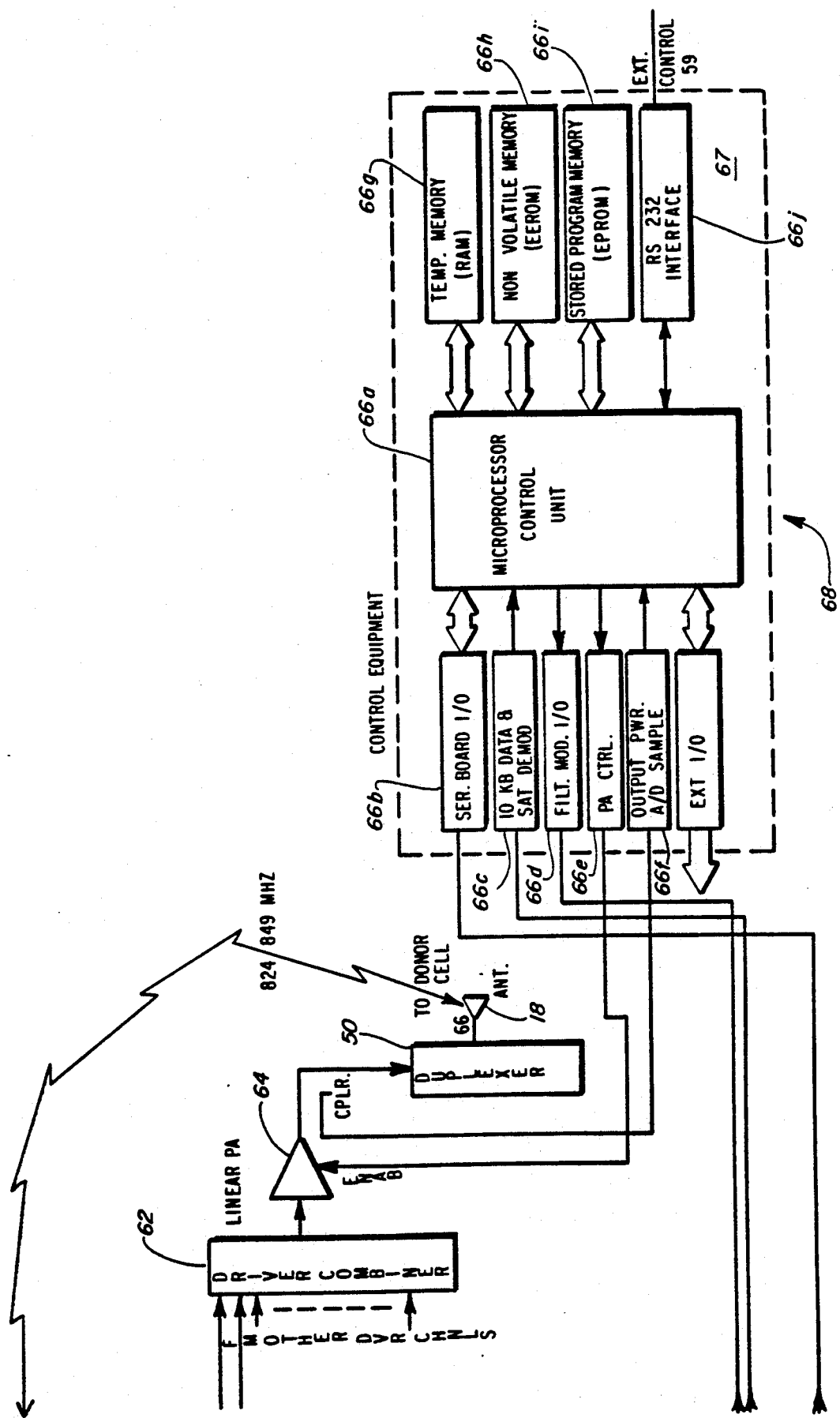

2.0 A Booster Measuring Signal Feedback and Adjusting Its Amplification Gain in Accordance with the Measured Feedback FIG. 7, consisting of FIG. 7A and FIG. 7B, again illustrates, partitioned in a slightly different manner, the system 10 in accordance with the present invention that was previously seen in FIG. 2. By comparison with FIG. 2, it may be observed that two same-direction communication channel paths 22, 24 are illustrated in detail in FIG. 7 instead of two opposite-direction communication channel paths 22, 32 that were illustrated in detail within FIG. 2.

For the purposes of the present invention there is nothing special, or unique, about the particular two communication channel paths 22, 24. These channel paths will be understood to be only exemplary. An opposite-direction pair of communication channel paths 32, 34 could have as well been illustrated in FIG. 7. Moreover, in a first of two preferred methods in accordance with the present invention a booster may measure signal feedback by use of only a single communication channel path, for example by use of communication channel path 22 only.

The signal-feedback-measuring booster system in accordance with the present invention overcomes the disadvantages of previous systems by (i) measuring the isolation between its antennas, and (ii) adjusting its gain accordingly. The (i) measurement and (ii) adjustment are normally conducted in an automated and routine manner, and without interference to ongoing communication activities. The booster, and a cellular communications system realized by use of the booster, is substantially immunized against RF feedback oscillations under all changing environments of use.

Referencing FIG. 7, it should be recalled that channel path 22, and channel path 24, may each be either a wideband or a narrowband communications path. It will further be recalled that a narrowband path is typically used for individually amplifying one of the available control channels, and a wideband path (nominally 10 MHz in width) is typically used for amplifying a multitude of voice channels.

Electromagnetic signal feedback occurs between the directional transmit and receive antennas 18, 20, due to imperfect isolation between the antennas. At such times as antenna 20 is used for the receipt of signals, primarily arising at mobile unit M (shown in FIG. 1) simultaneously while antenna 18 is being used for the transmission of signals, primarily to cell site 12 (shown in FIG. 1), then the signal feedback occurs in the direction D that is diagrammatically illustrated in FIG. 7.

It will of course be understood that feedback occurs between any transmitting antenna and any receiving antenna. Feedback would, for example, occur between antenna 20 and antenna 18 at such times as antenna 20 is used to transmit and antenna 18 to receive.

The level of isolation, and the resultant feedback, is typically approximately the same in one direction as in the opposite direction. The signal feedback, being primarily due to imperfect isolation between antennas 18, 20, is also approximately the same on different cellular communications channels at different frequencies. The system 10 in accordance with the present invention may be readily and efficiently be used, however, to monitor, measure, and adjust (i) all channels (ii) in both directions.

Minimum isolation may typically occur at any point within the passband of the wideband channel path or at the frequency of the narrowband channel path, and in either direction, depending on the many factors mentioned previously. Use of the present invention permits identification of the point of minimum isolation, and appropriate operational adjustment, so as to prevent RF oscillation even under worse case conditions.

The method in accordance with the present invention preferably makes use of narrowband channel paths in order to measure the isolation between the antennas for reasons discussed hereinafter. For this reason communication channel paths 22, 24 shown in FIG. 7, may be considered to be narrowband communication paths. Isolation can be measured at either the forward (869-894 MHz) or reverse (824-849 MHz) paths by a respective narrowband path. The two forward narrowband communication paths shown in FIG. 7 are representative of all forward and reverse narrowband and wideband paths.

In FIG. 7 the normal processing of signal frequencies $f_1$, $f_2$ that are respectively on the communication channel paths 22, 24 is to first be amplified by and in RX MULTICOUPLER 60, and down-converted to an intermediate frequency of 30 MHz by mixer 70a and voltage-controlled local oscillator 70b, and bandpass filtered by 30 KHz bandwidth IF FILTER 74c. That signal is then amplified by amplifier 74d, up-converted back to frequencies $f_1$, $f_2$ (or some offset therefrom) by mixer 72b and voltage controlled local oscillator 72a, and, finally, amplified by the RF power amplifier 72a.

Two voltage controlled local oscillators 70b, 72a are under control of the synthesizers 70d and 72d. If the output frequency is to be the same as the input frequency, then the two synthesizers 70d, 72d are set to provide the same local oscillator frequency. If the output frequency is to be different than the input frequency, then the output frequency synthesizer 72d is set to a different local oscillator frequency. To measure isolation by a first method in accordance with the present invention, the two synthesizers 70d, 72d are set to provide the same local oscillator frequency.

The Received Signal Strength Indicator (RSSI) measuring circuit 74f provides both a discriminator audio output DIS, and also an analog DC signal output LVL, that are each proportional to the radio frequency signal level. These outputs are received by MICROPROCESSOR 74b at its analog ports. The signal LVL in particular is digitalized by an analog to digital (A/D) converter internal to microprocessor 74b. The output of RSSI circuit 74f serves to provide MICROPROCESSOR 74b with a quantity representative of the input signal level.

In accordance with the present invention, programmable amplifier 74d acts as a switch. It will be recalled that programmable amplifier 74d receives input from an injection oscillator 74e: a stable, crystal oscillator at the 30 MHz intermediate frequency. The oscillator 74e is used to inject an intermediate frequency signal into the programmable amplifier 74d when a reference signal is to be transmitted. The injection oscillator 74e operates as a switch under the control of the G3C05 MICROPROCESSOR 74b.

In accordance with the first preferred method of the present invention, programmable amplifier 74d acting as a switch is controlled by MICROPROCESSOR 74b to break the amplification path and to switch to the 30 MHz injection oscillator 74e. The output signal level of injection oscillator 74e is calibrated so that, when it is switched into the communication channel path by action of amplifier 74d acting as a switch, a known signal level is transmitted by the output antenna 18. With the normal communication signal amplification path broken by the switched state of amplifier 74d, that portion of the output signal from antenna 18 that will appear at the input antenna 20 due to signal feedback is a portion of the known-signal-level reference signal.

The RSSI measuring circuit 74f presents an accurate reading of the input signal level to the MICROPROCESSOR 74b. The amount of antenna isolation is related to the difference in signal level that is measured by the RSSI measuring circuit 74f when a reference signal of known signal level is transmitted.

In theory no reference signal, let alone one of known amplitude such as that developed in injection oscillator 74e, is required to measure signal feedback. The communications signal level can simply be first measured in RSSI measuring circuit 74f when the signal is not being retransmitted, and again when the signal is being retransmitted. Providing the signal power level from the remote source of the communications signal (e.g., mobile source M shown in FIG. 1) remains constant, any increase in measured signal level during retransmission is due to signal feedback. Indeed, this approach, somewhat modified, of using an actual communications signal will be employed in a second preferred method of the invention hereinafter discussed.

In practice a reference signal of known signal strength, such as that signal developed in injection oscillator 74e, is preferred to be used. Moreover, this reference signal is preferably injected after such times, and upon such channels, as the communications signal is (temporarily) determined to be negligibly small. In such a case there is no substantial component of a direct communications signal in that signal measured by RSSI circuit 74f during the times of the substitution of the reference signal. In such a case the amount of antenna isolation (signal feedback) may be directly and unambiguously derived by MICROPROCESSOR 74b as the difference between the known output signal level at the output antenna 18, which output signal is derived from the reference injection oscillator 74e, and the level of the input signal that is measured by the RSSI measuring circuit 74f.

A narrowband amplification channel path that is employed to achieve this feedback measurement can be programmed at various times to an entire set of channel frequencies spanning the cellular band, particularly including those channel frequencies that are elsewise and at other times being boosted by the wideband amplification channel path. By sequencing from one frequency to the next all frequencies may be measured for feedback. That particular frequency at which minimum antenna isolation exists is determinable.

Each frequency is preferably measured for only a few milliseconds, with typically a dozen or so channel frequencies being measured to determine the isolation characteristics across the entire cellular communications band. The channel frequencies, and communication channels, that are selected for measurement are preferably ones that are known to be free, at least momentarily, from use by nearby cells. Measurement of feedback on a non-interference basis with communication not only benefits the integrity of the communications but also permits the better measurement of the relatively low feedback signals that are resultant from transmissions at the output antenna.

The feedback measurements may be manually initiated, or, as is normal, automatically initiated by MICROPROCESSOR 74b on a periodic basis to determine a change in isolation characteristics. The period between measurements is typically long, on the order of hours or days, because the isolation characteristics do not generally change very rapidly over this time span.

The intervals of isolation/feedback measurement are preferably kept short and infrequent on an as-needed basis in order to minimize any potential disruption to existing communication service. This is particularly pertinent if a channel that is normally used for amplifying a communications control signal is also used the purpose of measuring the antenna isolation. The duty cycle of the isolation/feedback measurement is typically less, and more typically much, much, less, than 1% of the total time that the system 10 is in use. Furthermore, even while the isolation/feedback measurements are in progress they typically consume only millisecond slots of time, and may be substantially unnoticeable to ongoing communications activities.

Further in accordance with the present invention, the signal isolation/feedback is not merely measured, but is preferably dynamically used to adjust the gain in one or more communications channel paths. This gain adjustment is directed to preventing RF oscillation due to unsuitably high feedback levels The MICROPROCESSOR 74b controls the gain of programmable amplifier 74d (as well as the signal coupled thereto). This gain is preferably controlled in inverse proportion with the measured level of signal isolation/feedback. The overall gain of the booster through each of the wideband and narrowband paths is typically controlled to be 10 dB less than the amount of antenna isolation that is measured upon each of these paths.

A second preferred method in accordance with the present invention makes use of the capability of each narrowband amplification channel 22, 24 to offset its output frequency. Consider the second channel path 24 illustrated in FIG. 7. Instead of interrupting the first amplification channel path 22 and injecting a reference 30 MHz signal, the output signal from the narrowband amplification channel path 22 is offset to a frequency where isolation/feedback is desired to be measured. The second channel path 24, tuned to the offset frequency, receives the feedback portion of this offset output signal. Similarly to channel path 22, the channel path 24 consists of down-mixer 70a, local oscillator 70b, IF filter 74c, amplifier 74d, RSSI circuit 74f, and the MICROPROCESSOR 74b. The channel path 24 is dynamically controlled by MICROPROCESSOR 74b so that its input frequency is tuned to the output frequency of the first narrowband amplification channel path 22.

The advantage of this second preferred method over the first preferred method is that an existing signal that is available from the donor cell M (shown in FIG. 1) can be used for measuring isolation. The use of 30 MHz injection oscillator 74e is not required. The signal from donor cell M is typically qualified to be of adequate signal strength so as to be appropriate to produce a non-negligible feedback signal when it is subsequently offset in frequency, amplified, and transmitted. This qualification is done by MICROPROCESSOR 74b within channel path 22 that compares the strength of the existing signal from donor cell M determined by RSSI circuit 74f also within channel path 22 to a predetermined, threshold, signal strength.

In the second preferred method the level of the transmitted output signal is known. It is the signal strength measured by the RSSI circuit 74f of channel path 22 times amount of gain that is set in the amplifier 74d of that same channel path 22. Typically the output signal level is controlled to be at a desired level by adjusting the amount of gain in the amplification path relative to the value that is read by the RSSI circuit. The input signal level is measured by the RSSI circuit 74f in the second amplification channel path 24.

Because the output frequency is different than the input frequency, the second narrowband amplification path 24 can be used to measure the level of signal that is being coupled back into the input antenna 20. The antenna isolation/feedback is determined as the difference between the known offset signal level ($f_2$) at the antenna 18 output and the measured signal level at the antenna 20 input ($f_2$). The output signal can be stepped in its frequency offset across the cellular band of interest in a manner similar to that described previously for first preferred method of the invention.

In the case of either the first or the second preferred methods in accordance with the present invention, an overall processor, or stored program control unit 65 (shown in FIG. 1), is used for instructing the local MICROPROCESSORS 74b regarding the channel path on which the isolation/feedback measurement is to be performed and the amount of gain that is to be provided on that channel path. The stored program control unit 65 further receives the RSSI signal level readings. Typically the isolation/feedback data is recorded, giving a historical record.

Figure 8:
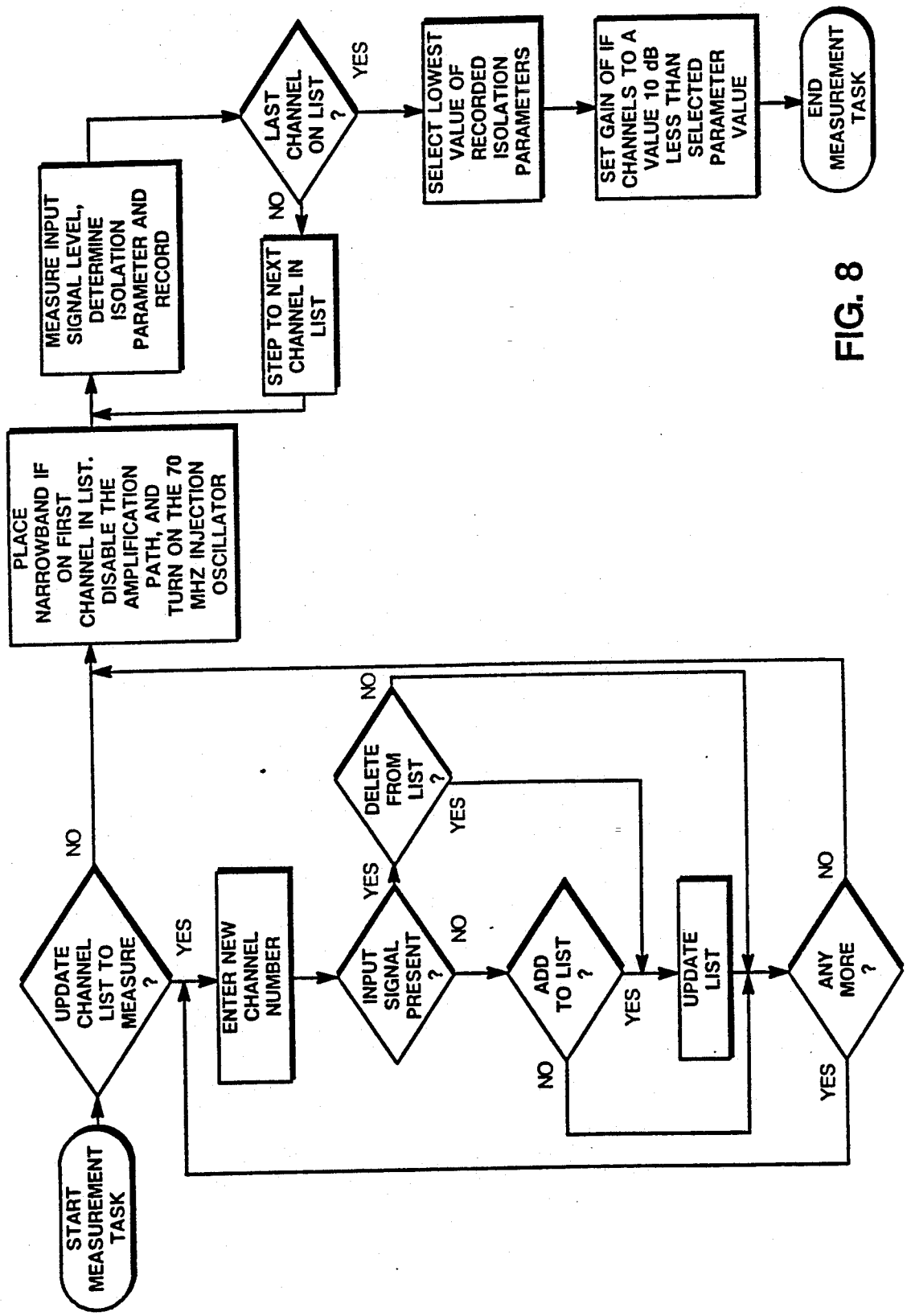
FIG. 8 is a flow diagram of a first preferred method of the present invention for measuring and controlling signal feedback on a boosted communication channel.
Figure 9:
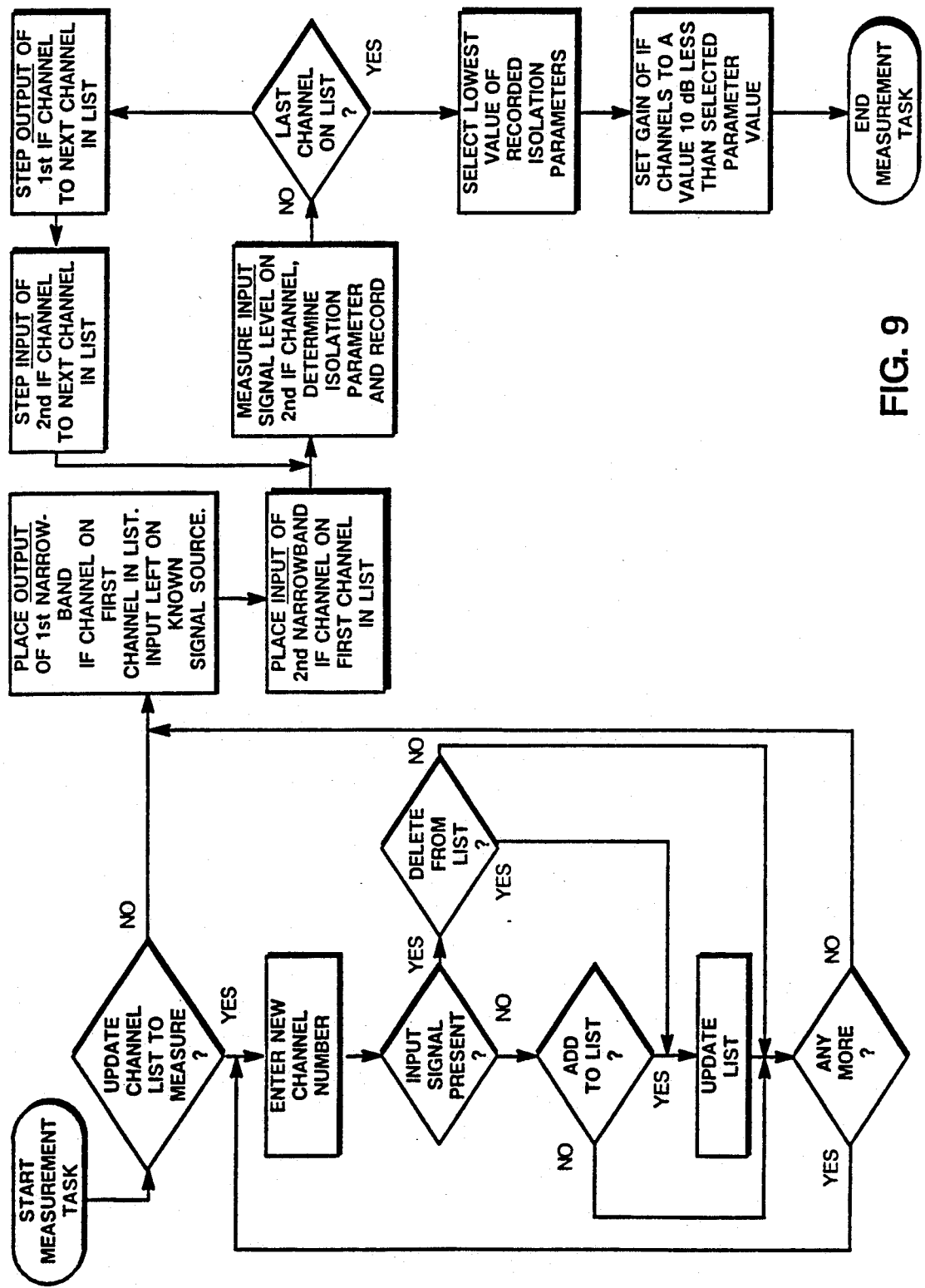
FIG. 9 is a flow diagram of a second preferred method of the present invention for measuring and controlling signal feedback on a booster communication channel.

FIGS. 8 and 9 are flow diagrams respectively depicting programs for implementing of the first and the second preferred methods in accordance with the present invention. In both diagrams, a candidate list of channels on which feedback testing will be performed is first determined or updated before the actual isolation/feedback measurement process takes place. That is, a group of channels that are typically more or less evenly spaced throughout the cellular band and that have no detectable signals from nearby cell sites are preferably selected. This selection of channels that are not currently receiving communication signals is strongly preferred in order to be able to measure the relatively low signal being feed back into the input antenna from the output antenna. Signals from nearby cell sites or mobiles tend to mask the signals from the output antenna, and provide erroneous measurements. Selecting unused channels in a cellular system is normally easily accomplished due to the normal separation between cell sites, and also due to the fact that the area being boosted is normally relatively devoid of cellular signals in the first place.

The isolation/feedback measurement process can also be invoked manually. It is typically so invoked during system installation so as to permit optimization of the isolation by orientation and location of the antennas.

The present invention will be recognized as having extensive temporal aspects. A signal for which the strength is measured at one time may at times thereafter serve as a reference signal. Isolation/feedback measurement is preferably performed at selected times when certain cellular communications signals are absent or, in the second preferred method of the invention, while other cellular communication signals are maintained at a fixed level. The isolation/feedback measurement process is, upon such times and channels as it is performed, preferably time multiplexed with any ongoing communication activity (or even inactivity) on such channels. One result of this extensive flexibility in the times, time periods, and channels upon which isolation/feedback measurement are performed, and any resulting adjustments of gain, is that the entire process is substantially transparent to operative use of the cellular communications system.

From the foregoing, it will be observed that numerous variations and modifications may be effected without departing from the spirit and scope of the novel concept of the invention. It is to be understood that no limitation with respect to the specific apparatus illustrated herein is intended or should be inferred. It is, of course, intended to cover by the appended claims all such modifications as fall within the scope of the claims.

I claim:

1. An apparatus for measuring feedback in an adjustable gain booster usable in a radiotelephone system, the booster having at least one adjustable gain amplifier and being capable of receiving signals at an input port and transmitting amplified signals corresponding thereto from an output port, the apparatus comprising:
    means for storing a list of signal channels to be measured;
    means for transmitting signals from the output port corresponding to said list;
    means for measuring a parameter value of each said transmitted signal;
    means for receiving signals at the input port, corresponding to said transmitted signals;
    means for measuring a parameter value of each received signal which corresponds to one of the transmitted signals; and
    means for processing said two parameter values associated with each said transmitted signal including means for forming an isolation indicium therefrom for each said transmitted signal.

2. An apparatus as in claim 1, including means for adjusting the gain of at least one amplifier of the booster in response to said formed isolation indicia.

3. An apparatus as in claim 1, including means for selecting a minimal isolation indicium and means for adjusting the gain of said at least one adjustable gain amplifier of the booster in response to said selected minimal isolation indicium.

4. An apparatus as in claim 3 including means for adjusting said gain so as to have a value on the order of 10 dB less than said selected minimal isolation indicium.

5. An apparatus as in claim 1 including means, coupled to said processing means, for generating a reference signal for transmission from the output port.

6. An apparatus as in claim 5 with said received signal measuring means including means for measuring a field strength parameter of a received signal corresponding to said transmitted reference signal.

7. An apparatus as in claim 6 including means for forming said isolation indicium from said received signal and said transmitted reference signal.

8. A method of measuring feedback in an adjustable gain booster usable in a radiotelephone system, the booster having at least one adjustable gain amplifier and being capable of receiving signals at an input port and transmitting amplified signals corresponding thereto from an output port, the method comprising:
    storing a list of signal channels to be measured;
    transmitting signals from the output port corresponding to the list;
    determining a parameter value of each transmitted signal;
    receiving at the input port signals corresponding to the transmitted signals;
    measuring a parameter value for each received signal;
    processing the two parameter values associated with each transmitted signal and forming an isolation indicium therefrom for each such transmitted signal.

9. A method as in claim 8 including adjusting the gain of said at least one adjustable gain amplifier of the booster in response to the formed isolation indicia.

10. A method as in claim 8 including selecting a minimal isolation indicium and adjusting the gain of said at least one adjustable gain amplifier in response to the selected indicium.

11. A method as in claim 10 including adjusting the gain so as to have a value on the order of 10 dB less than the selected minimal isolation indicium.

12. A method as in claim 8 including generating a reference signal for transmission from the output port.

13. A method as in claim 12 including measuring the received signal corresponding to the transmitted reference signal.

14. A method as in claim 13 including forming the isolation indicium from the measured received signal and the transmitted reference signal.

* * * * *